(12) United States Patent
Bushell

(10) Patent No.: US 12,408,028 B2
(45) Date of Patent: *Sep. 2, 2025

(54) SECURE DATA COMMUNICATION

(71) Applicant: Barclays Execution Services Limited, London (GB)

(72) Inventor: Scott Bushell, London (GB)

(73) Assignee: Barclays Execution Services Limited, London (GB)

( * ) Notice: Subject to any disclaimer, the term of this patent is extended or adjusted under 35 U.S.C. 154(b) by 542 days.

This patent is subject to a terminal disclaimer.

(21) Appl. No.: 17/869,236

(22) Filed: Jul. 20, 2022

(65) Prior Publication Data

US 2022/0417739 A1 Dec. 29, 2022

Related U.S. Application Data

(63) Continuation of application No. 16/669,374, filed on Oct. 30, 2019, now Pat. No. 11,445,364.

(30) Foreign Application Priority Data

Oct. 30, 2018 (GB) ...................................... 1817711

(51) Int. Cl.
*H04W 12/033* (2021.01)
*H04L 9/08* (2006.01)
(Continued)

(52) U.S. Cl.
CPC ......... *H04W 12/033* (2021.01); *H04L 9/0894* (2013.01); *H04L 9/3231* (2013.01);
(Continued)

(58) Field of Classification Search
None
See application file for complete search history.

(56) References Cited

U.S. PATENT DOCUMENTS 6,310,966 B1 * 10/2001 Dulude ................. G06Q 20/04
382/116
10,284,378 B2 5/2019 Haldenby et al.
(Continued)

FOREIGN PATENT DOCUMENTS

| CN | 106339676 A | 1/2017 |
| GB | 2 483 515 A | 3/2012 |
| GB | 2 542 449 A | 3/2017 |

OTHER PUBLICATIONS

SSL (Lincoln D. Stein, "Web Security, a step-by-step reference guide", 1998, ISBN: 0201634899). (Year: 1998) (Year: 1998).*
(Continued)

*Primary Examiner* — Piotr Poltorak
(74) *Attorney, Agent, or Firm* — Foley & Lardner LLP

(57) ABSTRACT

Method and system for securely communicating data, the method comprising the steps of: initiating a secure communication between a mobile device and a requester using a cryptographic key to verify the user of the mobile device. Receiving, using the secure communication, at a mobile device a request from the requester, the request including an indication of one or more requested data attributes associated with a user of the mobile device. At the mobile device, querying a data store for the requested one or more data attributes and a verification attribute. In response to the request, providing the requester, using the secure communication, with the requested one or more data attributes and the verification attribute from the data store, wherein the verification attribute is generated from one or more data items of a physical token issued to the user, the one or more data items including information characterising a biological feature of the user, the verification attribute also indicating that sensor data of a biological feature of the user detected by the mobile device has been matched to the information (Continued)

characterising the biological feature of the user. At the requester, receiving the verification attribute over the secure communication.

18 Claims, 22 Drawing Sheets

(51) Int. Cl.
 *H04L 9/32* (2006.01)
 *H04L 9/40* (2022.01)
 *H04W 12/069* (2021.01)
 *G06Q 20/10* (2012.01)
 *H04L 9/00* (2022.01)

(52) U.S. Cl.
 CPC .......... *H04L 9/3234* (2013.01); *H04L 9/3247* (2013.01); *H04L 63/0853* (2013.01); *H04L 63/0861* (2013.01); *H04W 12/069* (2021.01); *G06Q 20/10* (2013.01); *H04L 9/50* (2022.05)

(56) References Cited

U.S. PATENT DOCUMENTS

| | | |
|---|---|---|
| 10,951,615 B1 | 3/2021 | Paczkowski et al. |
| 2002/0161676 A1* | 10/2002 | Vadlamani ............. G07F 17/16 705/30 |
| 2013/0332359 A1 | 12/2013 | Qteishat |
| 2014/0316991 A1 | 10/2014 | Moshal |
| 2016/0162729 A1 | 6/2016 | Hagen et al. |
| 2016/0292676 A1 | 10/2016 | French et al. |
| 2017/0178237 A1 | 6/2017 | Wong |
| 2017/0257345 A1* | 9/2017 | Westra ................ H04W 12/069 |
| 2017/0279801 A1 | 9/2017 | Andrade |
| 2018/0005244 A1 | 1/2018 | Govindarajan et al. |

OTHER PUBLICATIONS

DeCusatis et al., "Identity-based network security for commercial blockchain services," 2018 IEEE 8th Annual Computing and Communication Workshop and Conference (CCWC), Las Vegas, NV, USA, 2018, pp. 474-477, doi: 10.1109/CCWC.2018.8301713. (Year: 2018).*

International Search Report for GB1817711.3 dated Mar. 19, 2019.

Notice of Allowance on U.S. Appl. No. 16/669,374 dated May 2, 2022.

Stallings, "Cryptography and Network Security: Principles and Practice (5th Edition)," (2010) ISBN-10: 0136097049, 1/10.

US Office Action on U.S. Appl. No. 16/669,374 dated Jan. 18, 2022.

US Office Action on U.S. Appl. No. 16/669,374 dated Nov. 2, 2021.

* cited by examiner

SECURE DATA COMMUNICATION

CROSS-REFERENCE TO RELATED APPLICATIONS

This present application is a Continuation of U.S. application Ser. No. 16/669,374, filed Oct. 30, 2019, which claims the benefit of and priority to GB Application No. 1817711.3, filed on Oct. 30, 2018, the contents of each of which is incorporated by reference herein in its entirety.

FIELD OF THE INVENTION

The present invention relates to a system and method for communicating data securely between different entities and in particular, communicating data describing individuals.

BACKGROUND OF THE INVENTION

It is often necessary to communicate personal data between individuals and organisations. However, it is important to secure such data so that identity fraud, involving the impersonation of a person to obtain goods or services, can be prevented. Therefore, individuals are advised to keep their personal details safe and never to share these details online. However, this can be inconvenient for individuals when legitimately setting up a relationship with a new organisation. In particular, when an individual wishes to obtain high value goods or services then manual identity checks may be required. This can involve an individual physically showing their credentials, such as a driving license or passport, to a representative of an organisation that the individual is entering into an agreement with. For example, hiring a car usually involves showing your driving license to a representative of the hire company, who can verify the driving license and any payment details in person before handing over the keys to the vehicle. This can be both costly in terms of time and resources as people need to be employed and be present to check these credentials.

Individuals may have existing and longstanding relationships with organisations who may have legitimately gathered personal details of those individuals. For example, a credit card company may build up a detailed payment history and address history for an individual that may stretch over many years. At the beginning of this relationship, the credit card company may have required the viewing of a government issued document, such as a passport or driving license, but this will no longer be required for longstanding relationships.

It may be possible for such organisations to vouch for the authenticity and provide other personal details of their customers but this is not usually possible as doing so may breach security or other requirements, as personal information may generally only be stored for certain uses and with the permission of the particular individual, which cannot extend to sharing this information outside the organisation.

Therefore, any new relationship must be started without knowledge of the individual even though particular individuals may be well-known to other trusted organisations.

Therefore, there is required a method and system that overcomes these problems.

SUMMARY OF THE INVENTION

A method and system are provided that allow secure storage and provision of data describing user attributes (e.g. name, address, age, income, gender, etc.) in a way that allows the user to retain control of their data but allows a requester of the data to be sure that the data are accurate and actually describes the particular user that is providing the data.

The user can generate claims or attestations (e.g. in the form of data components) for particular user data attributes. These are stored within a mobile device, on a server or in a cloud server, for example. The user obtains or is issued with a document, credential, token or physical token that can be used to verify the identity of the user. For example, this may be a government-issued document such as a passport or driving license. The token preferably has an electronic storage that contains biometric data specific to the user. For example, this may be a photograph (electronic image) of the user, their fingerprint(s) (or data derived from their fingerprint(s)), iris images or any other biometric data. For some physical tokens, there may be no electronic storage but instead the data is written or printed and can be read using optical character recognition (OCR), for example. The token will also contain attributes describing the user, such as their name, date of birth, address, passport number, etc.

To ensure that the user is the same person that is in possession of the token (e.g. issued with the document) then the mobile device may contain an application to read the biometric data from a data store (or from a printed representation of the biometric data) of the token. The data store of the token may be a secure digital data store within the physical token, for example. Separately, the mobile application can receive sensor data from the mobile device to record a current corresponding biological feature of the user. These data may be compared to confirm that the user is the rightful holder of the token or government-issued document. In one example, the sensor is a camera and the biometric data is an image (or live video) of the user. In this example, the user takes an image (or live video) of their face using the camera of the mobile device and the application (either within the mobile device or an external application) compares this with the image or other biometric data stored within the token.

If a match is determined and verified then a credential or verification attribute is generated and stored either within the mobile device or elsewhere. This may be cryptographically signed, e.g. using a digital signature of the user or otherwise derived from a cryptographic key of the user. The verification attribute is stored with or otherwise associated with the data attributes contained within the token (e.g. name, address, and/or passport number, etc.) A log of the generation of the verification attribute (and/or associated data attributes) may be stored within a distributed ledger. This may take the form of a template defining the structure of the verification (or other) attribute, such as its size, length, data format, number of fields, etc. It should be noted that neither the verification attribute nor the data attributes themselves are stored within the distributed ledger.

Further data attributes describing the user (that may or may not be included in the token) can be obtained from third parties (typically trusted organisations that have an existing relationship with the user). These third parties may include banks, credit card issuers, mobile networks, retail outlets, etc. The user may request confirmation from these third parties regarding particular user attributes (e.g. credit history). The user may request the third party or parties to vouch for them in order to generate the claims or attestations (i.e. user data attributes). This is achieved by the mobile application carrying out the biometric verification described above in order to prove that the correct user is making the request. Communication between the user and requester is secured by a key exchange mechanism. The user has a cryptographic key that is used to securely communicate the verification attribute. This key or a key derived or mathematically linked to this key is used to initiate the secure communication between the user and requester. Preferably, the requester has their own cryptographic key. These keys or the public key that corresponds to their private key are stored within the distributed ledger. Therefore, once this secure or point to point secure communication is set up then the requester can be certain that the user is who they claim to be and that the verification attribute originated from the same user. It should only be possible to associate these user data attributes with the user that generated the verification data from the token data (and biometric checks). Therefore, it can be assured that the user requesting the user attributes from a third party or providing the user data attributes from their physical token is the holder of that physical token.

Once the third party provides a user data attribute or attributes to the mobile application, these are stored in the mobile device or other data store. Consents or logs are stored within the distributed ledger confirming that an issuer of a user data attribute provided these to a user and that the user accepted them. These consents also log the requests from the requester and provision of the user data attributes by the user.

A requester (e.g. a merchant) of user attributes can make a request to the mobile application. The mobile application retrieves the stored user attribute data and sends this to the requester, who can verify the user data attributes because the verification attribute (and also in some examples the user data attributes) are signed and/or communicated using the user's cryptographic key (or cryptographic material linked or derived from the user's key) that was used to set up the secure communication channel between the user and requester. This allows organisations (e.g. merchants) that do not have an existing relationship with the user to be sure that they can trust the provided data (describing the user). Furthermore, the data (user attribute data) is held and controlled by the user (i.e. stored within their mobile device or within a cloud server only accessible to them). Therefore, their data can be used, communicated and stored more securely without losing control or requiring the use of trusted intermediaries. Additionally, verification of an identity (i.e. the biometric checks) need not take place where data is being provided to the requester as this has taken place in advance during an initial claim creation (i.e. using the physical token). Biometric data does not need to be provided outside of the user device.

In the system described above, the requester (merchant) can initiate a request from the user for user data attributes. If these have already been stored then a response to the request may be provided immediately from the mobile device. If the requested user data attributes (e.g. attestations or claims) have not been previously generated then the mobile device can initiate the process to request such user data attributes from the trusted third party or parties. Once generated then the mobile device can respond to the initial request. The response may also include payment information either separately or as a single response. The payment information may take the form of a payment token and itself bound to the verifiable user data attribute(s)

When a user is enrolled in the system, first time provisioning may take place. This initially registers a new user onto a distributed ledger. This uses an initial biometric check and associated data attributes, which become a trust anchor or initial claim. Effectively this is a self-attested trust anchor that uses a government issued document or other trusted physical token. Therefore, remote on-boarding of users may take place, which is useful for scaling and usage adoption.

The identity of an individual or user can be described or referenced in several ways. The distributed ledger may record identifiers of users and this is where the initial registration of a user (via a trust anchor that uses biometric data from the physical token) occurs and is the first provisioning process. Once the user has an identity 'record' established on the distributed ledger then they can then request and receive further claims from issuers. Whist the system includes identifiers, each user may not be personally identifiable in some implementations but this still ensures that the presentation of claims are verifiable from users. The identifier record may be checked and the claim itself can be cryptographically signed.

Following first provisioning, users can then provide verifiable attributes (from issued claims, and these may include biometric checks) to requesters (e.g. merchants). One type of verifiable credential could be a representation of passport data, drivers licence data or a confirmation of identity issued from a bank. This is different to the initial identifier 'record' that is set up on the distributed ledger.

In accordance with a first aspect there is provided a method for securely communicating data, the method comprising the steps of:

initiating a secure communication between a mobile device and a requester using a cryptographic key to verify of a user of the mobile device (preferably to verify the identity of the user);

receiving, using the secure communication, at a mobile device a request from the requester, the request including an indication of one or more requested data attributes associated with a user of the mobile device;

at the mobile device, querying a data store for the requested one or more data attributes and a verification attribute;

in response to the request, providing the requester, using the secure communication, with the requested one or more data attributes and the verification attribute from the data store, wherein the verification attribute is generated from one or more data items of a physical token issued to the user, the one or more data items including information characterising a biological feature of the user, the verification attribute also indicating that sensor data of a biological feature of the user detected by the mobile device has been matched to the information characterising the biological feature of the user; and at the requester, authenticating the verification attribute by verifying that the verification attribute was generated from the cryptographic key of the user. Therefore, the user retains control of their personal data (data attributes associated with the user) but these can be provided by the user to another party securely and in a way that the other or requesting party can verify the authenticity of the data attributes. This may be the first interaction that the user has will the requester, who will first request particular user data attributes and then need to verify or authenticate them, which is achieved using the distributed ledger, which enables both the secure communication to be set up between the user and requester and also is used to confirm that the verification attribute came from the same user. The existence of the verification attribute may itself indicate that the sensor data of the biological feature of the user detected by the mobile device has been matched to the information characterising the biological feature of the user or the verification attributed may include or be linked to an expiry date (e.g. within a distributed ledger) that confirms (if not expired) that the match has occurred and is in force, for example. As the verification attribute is communicated to the requester using communication (e.g. a communication channel) that has been secured by a cryptographic key of the user then the requester can verify that the verification attribute originates, describes or authenticates the correct user. The verification attribute may be linked to the user in other or further ways (e.g. using cryptographic key of the user when creating or storing it). The user may be required provide consent or release the user data attributes before they are sent to the requester, for example. This consent may be provided using the user's cryptographic key, for example.

Optionally, the step of initiating the secure communication between the mobile device and the requester may further uses a cryptographic key to verify the identity of the requester. This cryptographic key may be part of a public/private key pair.

Preferably, the cryptographic key used to verify the identity of the user and/or the requester is stored in a distributed ledger and wherein the step of initiating the secure communication between a user of a mobile device and a requester includes retrieving the cryptographic key of the user and/or requester from the distributed ledger. The distributed leger may store the public keys. Preferably, both parties have their cryptographic key stored in the distributed ledger although having the user's key ensures that their claims can be verified.

Optionally, the method may further comprise the step of verifying the data attributes associated with a user by:
  retrieving from a distributed ledger data describing the one or more data attributes; and
  comparing the one or more data attributes with the retrieved data. The data describing the one or more attributes (and/or verification attribute) may be in the form or templates describing their structure, for example.

Optionally, the data describing the one or more data attributes may describe any one or more of: the size, length, data structure, format of the one or more data attributes, creation time, expiration, and/or revocation. Other properties may be included. However, the actual data is not stored within the distributed ledger.

Optionally, the method may further comprise the step of storing within the distributed ledger, a log of the request and a log of the response. Other logs may be stored.

Optionally, the distributed ledger may be a blockchain. Other types of distributed ledgers may be used.

Optionally, the distributed ledger may be stored as a non-linear structure based on directed acyclic graphs.

Optionally, the distributed ledger may be stored as a hashgraph. Hashgraphs are described in hackernoon.com/demystifying-hashgraph-benefits-and-challenges-d605e5c0cee5 (retrieved 17 Sep. 2018).

Optionally, the data store may be within the mobile device or within an external database accessible over a network. This may be a cloud server, for example.

Optionally, the method may further comprise the step of the requester storing a log of the request and a log of the receiving the one or more user data attributes. This can assist with proving a particular event or transaction took place.

Optionally, the information characterising a biological feature of the user may be stored and within a secure digital data store within the physical token. This may be an NFC chip, for example. However, printed stores of information may be read using OCR or other technology.

Optionally, the physical token issued to the user may be: an identity card, a government-issued document, a government-issued identity card, a passport, or a driving license. Other physical tokens (e.g. documents, cards, devices, memory stores, etc.) may be used. Preferably, these physical tokens may include secure storage that is passive and does not require power (e.g. FLASH RAM or ROM).

Optionally, the data describing a biological feature may be: a photograph of the user, a video of the user, an image of the user, a fingerprint, an image of an iris, or a voice recording. Other biological features may be used.

Preferably, the step of authenticating the verification attribute further comprises obtaining current biometric data from the user using a sensor within the mobile device.

Optionally, the sensor may be one or more cameras, a fingerprint sensor, and/or one or more microphones. Combinations of biometric data may be sensed and combined. Other sensors may be used. The mobile device may be a smartphone, tablet, portable computer or other device, for example.

Optionally, the verification attribute may be associated with the one or more data attributes. Association may be achieved by storing the credential and data attribute(s) together in the same location, stored together with an identifier (e.g. a cryptographic key or signature of the user), combined to form a single data structure, or other digital or logical association.

Advantageously, the verification attribute and the one or more data attributes are associated using a digital signature or public/private key pair of the user. Therefore, the association and verification can be achieved more securely and conveniently.

Optionally, the one or more requested data attributes may be any one or more of: name, age, date of birth, and address. Other data attributes and combinations of data attributes may be requested.

Optionally, the one or more requested data attributes may be stored within or derived from the physical token issued to the user.

Preferably, the one or more requested data attributes may originate from an external organisation (e.g. trusted organisation). In general, the data attributes describing the user may be obtained from other sources, such as a third party (either at the time of the request, shortly afterwards or in advance).

Optionally, the data attributes originating from the external organisation may be digitally signed by the external organisation.

Optionally, the method may further comprise the step of verifying the data attributes originating from the external organisation by:
  retrieving from a distributed ledger data describing the one or more data attributes, including an identifier of the external organisation, and/or cryptographic signature of the external organisation; and
confirming that the external organisation meets a predetermined level of trust based on the retrieved data.

Advantageously, initiating the secure communication between a user of a mobile device and a requester may further include using graphical representation of data displayed to by the mobile device to the requester and/or by the requester to the mobile device. For example, this may be achieved by displaying a QR code to a camera of the mobile device, which initiates communications between the request and mobile device (e.g. utilising network or Internet communications). The QR code may include all details of the request.

Optionally, the graphical representation of data may include the cryptographic key of the user and/or a cryptographic key of the requester. The graphical representation may also include other data.

Optionally, the response may further include payment data enabling the requester to obtain payment from the user. Therefore, user information and payment may be obtained simultaneously reducing network traffic, decreasing time and validation messaging. In some examples, a payment request may also be included with the QR code together with the user data attribute(s) request. For example, the request and acceptance of the verification attribute by the requester may be integrated with the use of a payment gateway. Such a payment gateway may be distributed to requesters (e.g. merchants and other organisations that can request payment for goods and/or services). Such payment gateways may be implemented within a pay page (e.g. on a web page) and/or registration page. When integrated within a registration page of a new user (e.g. a customer) then this can improve efficiency of the system by combining registration and payment processes.

In accordance with a second aspect, there is provided a mobile device comprising:
one or more processors;
one or more sensors configured to generate sensor data; and
memory storing computer-executable instructions that, when executed by the one or more processors, cause the mobile device to:
  initiate a secure communication between the mobile device and a requester using a cryptographic key to verify the identity of the user;
  receive, using the secure communication, request from the requester, the request including an indication of one or more requested data attributes associated with a user of the mobile device;
  query a data store for the requested one or more data attributes and a verification attribute;
  in response to the request, provide the requester, using the secure communication, with the requested one or more data attributes and the verification attribute from the data store, wherein the verification attribute is generated from one or more data items of a physical token issued to the user, the one or more data items including information characterising a biological feature of the user, the verification attribute also indicating that sensor data of a biological feature of the user detected by the mobile device has been matched to the information characterising the biological feature of the user. Furthermore, the instructions may cause the mobile device to carry out any of the methods and any combinations of method steps described above.

In accordance with a third aspect, there is provided a method for securely storing data attributes of a user within a mobile device, the method comprising the steps of:
  reading one or more data items from a physical token issued to the user, the one or more data items including information characterising a biological feature of the user and one or more data attributes associated with the user;
  detecting the biological feature of the user using one or more sensors of the mobile device to generate sensor data;
  determining a match between the sensor data and the information characterising a biological feature of the user;
  after determining the match, generating a verification attribute, wherein the verification attribute indicates that the sensor data of the biological feature of the user detected by the mobile device has been matched to the information characterising the biological feature of the user; and
  storing the one or more data attributes associated with the user and the verification attribute within a data store. This method may be used separately or in combination with any of the above methods for securely communicating data. When used in combination, this is particularly advantageous. This method may be used to generate, obtain and/or store the requested one or more attributes associated with the user, for example. Determining the match between the sensor data and the data describing the biological feature of the user may be carried out within the mobile device (e.g. within the same mobile application that carries out other method steps), at a separate mobile application within the mobile device, or at an external server (e.g. cloud-based) that responds to the mobile device with an indication or score of the match, for example.

Optionally, the method may further comprise storing a cryptographic key of the user used to secure communication of the verification attribute in a distributed ledger.

Optionally, the distributed ledger may be based on a blockchain.

Optionally, the distributed ledger may be stored as a non-linear structure based on directed acyclic graphs.

Optionally, the distributed ledger may be stored as a hashgraph.

Optionally, the method may further comprise the step of storing in the distributed ledger, data describing the one or more data attributes and/or verification attribute, wherein the data describing the one or more data attributes is one or more of: the size, length, data structure, format of the one or more data attributes, creation time, expiration, and/or revocation.

Preferably, the further method may further comprise the step of receiving one or more additional data attributes associated with the user from an external source. Therefore, external or trusted organisations can provide data attributes or claims for a user. This allows these organisations to vouch for the authenticity of data describing the user (e.g. their age, address, credit rating, etc.).

Optionally, the method may further comprise the step of storing the one or more additional data attributes within the data store. The user may therefore, retain control of data either derived from the physical token or received from an external organisation (e.g. a trusted organisation). Each requester may have a particular set of organisations that they trust. This set may vary from requester to requester or vary depending on purpose or transaction value, for example.

Preferably, the method may further comprise the step of storing within a distributed ledger data describing the one or more additional data attributes, wherein the data describing the one or more additional data attributes is one or more of: the size, length, data structure, format of the one or more data attributes, creation time, expiration, revocation, identifier of the external source, and/or a cryptographic signature of the external source. The Distributed ledger may log any or all of the steps and these logs may be linked, e.g. by the use of public keys or hashes.

Optionally, the method may further comprise the steps of:
  generating a new verification attribute from the data describing the biological feature of the user and the sensor data;
  storing the one or more additional data attributes associated with the new verification attribute and the one or more additional data attributes associated with the new user credential, within the data store. This may be achieved by repeating the biometric data check. For example, for higher value transactions or actions (e.g. buying or hiring a car), these steps may be repeated at or after the time of the request. The biometric checks may require the reading of the biometric data from the physical token or such data may be stored (e.g. securely) within the mobile device so that access to the physical token is not required a second or subsequent time.

Optionally, the method may further comprise the step of associating a payment token with the stored verification attributed within the data store. The payment token may be generated from bank details, a credit card (e.g. physical or virtual), an electronic wallet or other sources, for example. Combining a payment token with the biometric-enhanced identity credential provides a higher security card not present payment method. This may be further enhanced by a liveness and presence' check by invoking the biometric re-check process, as it proves that the genuine cardholder is indeed present even though a transaction may be carried out over a network such as the internet, when the merchant and customer (together with physical payment card) are at different locations. In one implementation, the payment token may be an EMV (Europay MasterCard Visa) token, for example.

Optionally, the data store may be within the mobile device or within an external database accessible over a network. For example, the part of the external database may only be accessible to the user.

Advantageously, the method may further comprise the steps of: initiating a secure communication between the mobile device and a requester using the cryptographic key to verify the identity of a user of the mobile device;
  receiving a request over the secure communication from a requester, the request including an indication of one or more requested data attributes associated with a user of the mobile device;
  querying the data store for the requested one or more data attributes;
  providing the requester, using the secure communication, with the requested one or more data attributes and the verification attribute from the data store.

Advantageously, the method may further comprise the step of the requester authenticating the verification attribute by verifying that the verification attribute communicated using the cryptographic key of the user.

Optionally, the request from the requester may be received by the mobile device in the form of a graphical representation of data including the cryptographic key of the user. This may include a request for payment (e.g. amount, payee, account details, account name, etc.).

Optionally, the method may further comprise the step of the requester indicating in the request a requirement to generate a new verification attribute, wherein the verification attribute indicates that the further sensor data of the biological feature of the user detected by the mobile device has been matched to the information characterising the biological feature of the user. The distributed ledger does not contain the one or more additional data attributes but instead stores a log of their creation, use, existence and/or revocation. This authentication may include verifying from the log in the distributed ledger, the source of the additional data attribute(s) (e.g. an identifier or digital signature of the trusted organisation or third party). The verification may only be successful for particular sources required by the requester (e.g. these may be specified in the request).

In accordance with a fourth aspect, there is provided a mobile device comprising:
  one or more processors;
  one or more sensors configured to generate sensor data; and
  memory storing computer-executable instructions that, when executed by the one or more processors, cause the mobile device to execute any of the previous steps in any combination.

The methods described above may be implemented as a computer program comprising program instructions to operate one or more computer processors. The computer program may be stored on a computer-readable medium.

The computer system may include a processor or processors (e.g. local, virtual or cloud-based) such as a Central Processing unit (CPU), and/or a single or a collection of Graphics Processing Units (GPUs). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows (RTM) or Linux, for example.

It should be noted that any feature described above may be used with any particular aspect or embodiment of the invention.

The following numbered clauses provide additional example implementations:

1. A method for securely communicating data, the method comprising the steps of:
  initiating a secure communication between a mobile device and a requester using a cryptographic key to verify the user of the mobile device;
  receiving, using the secure communication, at a mobile device a request from the requester, the request including an indication of one or more requested data attributes associated with a user of the mobile device;
  at the mobile device, querying a data store for the requested one or more data attributes and a verification attribute;
  in response to the request, providing the requester, using the secure communication, with the requested one or more data attributes and the verification attribute from the data store, wherein the verification attribute is generated from one or more data items of a physical token issued to the user, the one or more data items including information characterising a biological feature of the user, the verification attribute also indicating that sensor data of a biological feature of the user detected by the mobile device has been matched to the information characterising the biological feature of the user; and
  at the requester, receiving the verification attribute over the secure communication.

2. The method of clause 1, wherein the step of initiating the secure communication between the mobile device and the requester further uses a cryptographic key to verify the identity of the requester.

3. The method of clause 1 or clause 2, wherein the cryptographic key used to verify the identity of the user and/or the requester is stored in a distributed ledger and wherein the step of initiating the secure communication between a user of a mobile device and a requester includes retrieving the cryptographic key of the user and/or requester from the distributed ledger.

4. The method according to any previous clause further comprising the step of verifying the data attributes associated with a user by:
  retrieving from a distributed ledger data describing the one or more data attributes; and
  comparing the one or more data attributes with the retrieved data.

5. The method of clause 4, wherein the data describing the one or more data attributes describe any one or more of: the size, length, data structure, format of the one or more data attributes, creation time, expiration, and/or revocation.

6. The method according to any previous clause further comprising the step of storing within the distributed ledger, a log of the request and a log of the response.

7. The method according to any of clauses 3 to 6, wherein the distributed ledger is a blockchain.

8. The method according to any of clauses 3 to 7, wherein the distributed ledger is stored as a non-linear structure based on directed acyclic graphs.

9. The method according to any of clauses 3 to 8, wherein the distributed ledger is stored as a hashgraph.

10. The method according to any previous clause, wherein the data store is within the mobile device or within an external database accessible over a network.

11. The method according to any previous clause further comprising the step of the requester storing a log of the request and a log of the receiving the one or more user data attributes.

12. The method according to any previous clause, wherein the information characterising a biological feature of the user is stored and within a secure digital data store within the physical token.

13. The method according to any previous clause, wherein the physical token issued to the user is: an identity card, a government-issued document, a government-issued identity card, a passport, or a driving license.

14. The method according to any previous clause, wherein the data describing a biological feature is: a photograph of the user, a video of the user, an image of the user, a fingerprint, an image of an iris, or a voice recording.

15. The method according to any previous clause, wherein the step of authenticating the verification attribute further comprises obtaining current biometric data from the user using a sensor within the mobile device.

16. The method of cl clause 15, wherein the sensor is one or more cameras, a fingerprint sensor, and/or one or more microphones.

17. The method according to any previous clause, wherein the verification attribute is associated with the one or more data attributes.

18. The method of clause 17, wherein the verification attribute and the one or more data attributes are associated using a digital signature or public/private key pair of the user.

19. The method according to any previous clause, wherein the one or more requested data attributes are any one or more of: name, age, date of birth, and address.

20. The method according to any previous clause, wherein the one or more requested data attributes is stored within or derived from the physical token issued to the user.

21. The method according to any previous clause, wherein the one or more requested data attributes originates from an external organisation.

22. The method of clause 21, wherein the data attributes originating from the external organisation are digitally signed by the external organisation.

23. The method of clause 21 or clause 22 further comprising the step of verifying the data attributes originating from the external organisation by:
  retrieving from a distributed ledger data describing the one or more data attributes, including an identifier of the external organisation, and/or cryptographic signature of the external organisation; and
  confirming that the external organisation meets a predetermined level of trust based on the retrieved data.

24. The method according to any previous clause, wherein initiating the secure communication between a user of a mobile device and a requester further includes using graphical representation of data displayed to by the mobile device to the requester and/or by the requester to the mobile device.

25. The method of clause 24, wherein the graphical representation of data includes the cryptographic key of the user and/or a cryptographic key of the requester.

26. The method according to any previous clause, wherein the response further includes payment data enabling the requester to obtain payment from the user.

27. A mobile device comprising:
  one or more processors;
  one or more sensors configured to generate sensor data; and
  memory storing computer-executable instructions that, when executed by the one or more processors, cause the mobile device to:
    initiate a secure communication between the mobile device and a requester using a cryptographic key to verify the identity of the user;
    receive, using the secure communication, request from the requester, the request including an indication of one or more requested data attributes associated with a user of the mobile device;
    query a data store for the requested one or more data attributes and a verification attribute;
    in response to the request, provide the requester, using the secure communication, with the requested one or more data attributes and the verification attribute from the data store, wherein the verification attribute is generated from one or more data items of a physical token issued to the user, the one or more data items including information characterising a biological feature of the user, the verification attribute also indicating that sensor data of a biological feature of the user detected by the mobile device has been matched to the information characterising the biological feature of the user.

28. A method for securely storing data attributes of a user within a mobile device, the method comprising the steps of:
  reading one or more data items from a physical token issued to the user, the one or more data items including information characterising a biological feature of the user and one or more data attributes associated with the user;

detecting the biological feature of the user using one or more sensors of the mobile device to generate sensor data;

determining a match between the sensor data and the information characterising a biological feature of the user;

after determining the match, generating a verification attribute, wherein the verification attribute indicates that the sensor data of the biological feature of the user detected by the mobile device has been matched to the information characterising the biological feature of the user; and storing the one or more data attributes associated with the user and the verification attribute within a data store.

29. The method of clause 28 further comprising storing a cryptographic key of the user used to secure communication of the verification attribute in a distributed ledger.

30. The method of clause 29, wherein the distributed ledger is based on a blockchain.

31. The method of clause 29, wherein the distributed ledger is stored as a non-linear structure based on directed acyclic graphs.

32. The method to clause 30 or clause 31, wherein the distributed ledger is stored as a hashgraph.

33. The method according to any of clauses 29 to 32 further comprising the step of storing in the distributed ledger, data describing the one or more data attributes and/or verification attribute, wherein the data describing the one or more data attributes is one or more of: the size, length, data structure, format of the one or more data attributes, creation time, expiration, and/or revocation.

34. The method according to any of clauses 28 to 33, further comprising the step of receiving one or more additional data attributes associated with the user from an external source.

35. The method of clause 34 further comprising the step of storing the one or more additional data attributes within the data store.

35. The method of clause 35 further comprising the step of storing within a distributed ledger data describing the one or more additional data attributes, wherein the data describing the one or more additional data attributes is one or more of: the size, length, data structure, format of the one or more data attributes, creation time, expiration, revocation, identifier of the external source, and/or a cryptographic signature of the external source.

37. The method according to clause 35 or clause 36, further comprising the steps of:

generating a new verification attribute from the data describing the biological feature of the user and the sensor data;

storing the one or more additional data attributes associated with the new verification attribute and the one or more additional data attributes associated with the new user credential, within the data store.

38. The method according to any of clauses 28 to 37 further comprising the step of associating a payment token with the stored verification attributed within the data store.

39. The method according to any of clauses 28 to 38, wherein the data store is within the mobile device or within an external database accessible over a network.

40. The method according to any of clauses 28 to 39 further comprising the steps of:

initiating a secure communication between the mobile device and a requester using the cryptographic key to verify the identity of a user of the mobile device;

receiving a request over the secure communication from a requester, the request including an indication of one or more requested data attributes associated with a user of the mobile device;

querying the data store for the requested one or more data attributes;

providing the requester, using the secure communication, with the requested one or more data attributes and the verification attribute from the data store.

41. The method of clause 40 further comprising the step of the requester authenticating the verification attribute by verifying that the verification attribute was communicated using the cryptographic key of the user.

42. The method of clause 40 or clause 41, wherein the request from the requester is received by the mobile device in the form of a graphical representation of data including the cryptographic key of the user.

43. The method according to any of clauses 28 to 42 further comprising the step of the requester indicating in the request a requirement to generate a new verification attribute, wherein the verification attribute indicates that the further sensor data of the biological feature of the user detected by the mobile device has been matched to the information characterising the biological feature of the user.

44. A mobile device comprising:
one or more processors;
one or more sensors configured to generate sensor data; and
memory storing computer-executable instructions that, when executed by the one or more processors, cause the mobile device to execute the steps of any of claims 25 to 36.

45. A computer program comprising instructions which, when the program is executed by one or more computer processors, cause the one or more computer processors to carry out the method of any of clauses 1 to 26 or 28 to 43.

46. A computer-readable data carrier having stored thereon the computer program of clause 45.

BRIEF DESCRIPTION OF THE FIGURES

The present invention may be put into practice in a number of ways and embodiments will now be described by way of example only and with reference to the accompanying drawings, in which.

It should be noted that the Figures are illustrated for simplicity and are not necessarily drawn to scale. Like features are provided with the same reference numerals.

DETAILED DESCRIPTION OF THE PREFERRED EMBODIMENTS

Certain documents may be used to verify the identity of an individual or user. Such documents include government-issued cards and books such as driving licenses and passports. These documents may be considered as a physical token issued to a user that may contain information or data that can verify the identity of the user (or to confirm other characteristics or data relating to them) and link the particular individual with the physical token. Such physical tokens may store the information as text or images and/or may include computer-readable media such as RFID integrated circuits and antennas that contain similar or additional information to that stored graphically or textually on or within the physical token. For example, a UK passport may contain an integrated circuit that stores data printed within the passport and also may contain an image file of the photograph of the passport holder.

The storage within the physical token may have particular security mechanisms and may also contain different storage locations with one or more storage locations having the ability to be read by any suitable reader and other storage locations being encrypted or secured so that only authorised retrieval of the data may occur.

It is also possible to read at least some portions of the data stored within a UK passport using near field communication (NFC) readers incorporated within smartphones (e.g. Android). Where NFC is not available then optical character recognition (OCR) may be used instead to read the data from the passport (or other physical token). Other techniques may also be used to obtain the data. Such smartphones or similar mobile devices also contain one or more cameras that can be used to obtain a current image of the user (and may also be used to obtain an image for OCR processing, where required). Functionality or software for reading the data (either using NFC or OCR) may be provided by InnoValor Software B.V. Furthermore, details from such physical tokens (e.g. passports) can be verified against a live image of a user to verify their identity using a mobile device such as a smartphone. Such a biometric capture system and method (e.g. mobile application) may be provided by Iproov Limited, of London, United Kingdom.

Therefore, there can exist a secure method for determining the identity and other user data attributes from a holder of a physical token that is preferably issued by an authorised or trusted organisation, such as a government or driving license authority.

Figure 1:
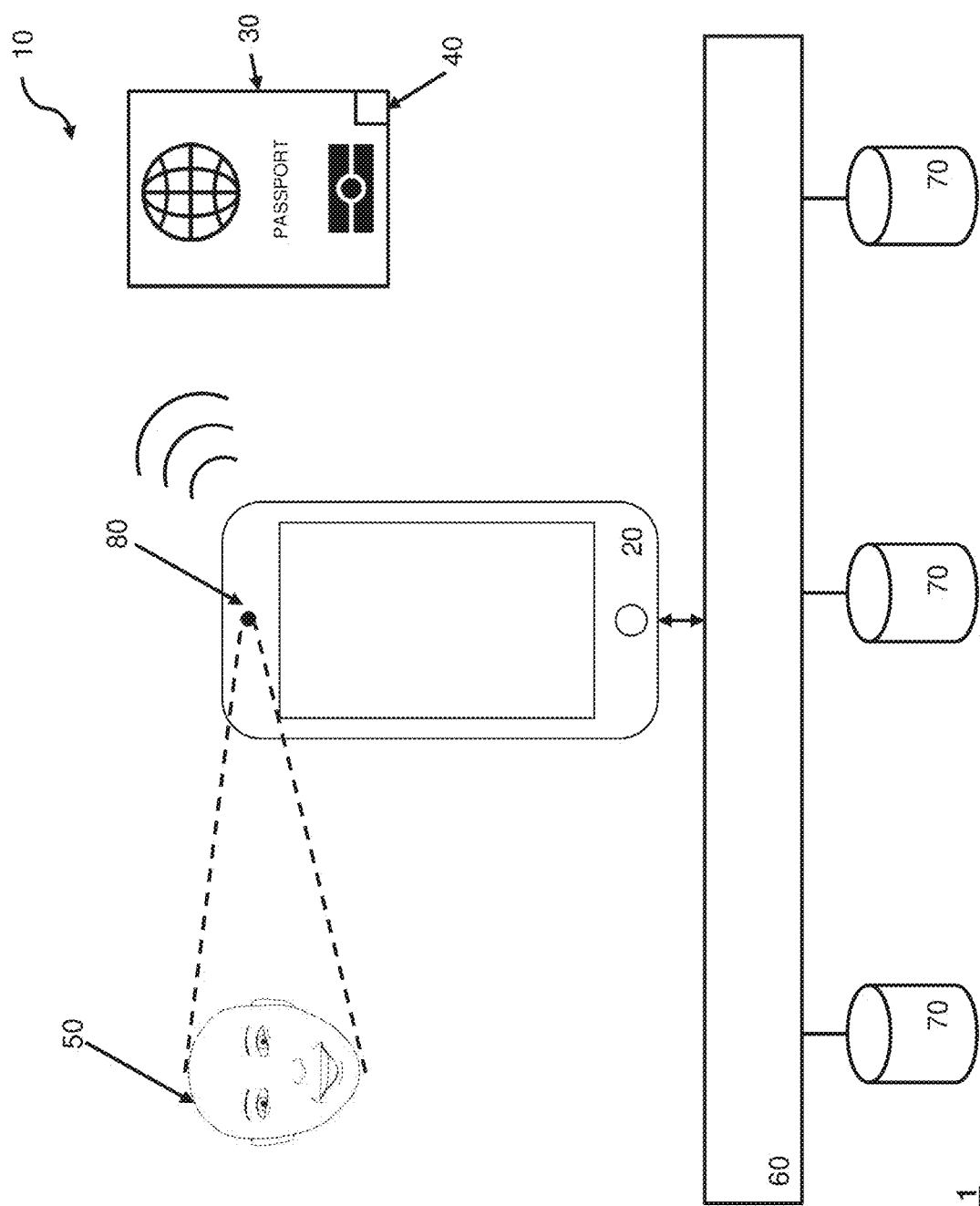
FIG. 1 shows a schematic diagram of a system for securely storing data attributes of a user.

FIG. 1 shows a schematic diagram of a system 10 that incorporates a mobile device 20 (e.g. smartphone) that can read data from within a physical token 30 (e.g. passport) having a storage integrated circuit 40 or chip. FIG. 1 shows the mobile device 20 reading the chip 40 using NFC or other non-contact technology. The mobile device 20 also includes a camera 80 for obtaining an image (preferably a live image) of a user 50. Various techniques may be used to confirm that an image of a real person is being acquired and not simply a photograph or video of that person. These techniques may include changing the lighting or colours illuminating the user's face in a particular and rapid sequence that can be changed or randomised, for example.

Security may be enhanced and control of the data may be retained by the user because all data attributes describing the user are stored, preferably solely, within the mobile device 20 or within a server data store accessible only to the user. The data may also be distributed between the mobile device 20 and the server data store, for example. During an enrolment procedure, the user 50 initiates a mobile application within the mobile device 20 (not shown in this figure), which instructs the NFC reader within the mobile device 20 to read the chip 40 within the physical token 30. This process retrieves a stored image of the user 50 from the chip 40 as well as data attributes describing the user 50, such as their name and address and other information (e.g. passport number).

The mobile application initiates the camera 80 within the mobile device 20 and instructs the camera 80 to obtain an image or series of images (e.g. a live view) of the user. Simultaneously, the mobile application may take action to ensure that an image of a real person is being person is being obtained, such as by changing the illumination or colours generated within a screen of the mobile device 20 in a particular randomised order.

The mobile application carries out a matching algorithm to match the obtained image of the user 50 with the stored image from the chip 40 within the physical token 30. Again, various algorithms or techniques may be used to confirm a match between the images or determine a particular confidence level or similarity metric between these images. This confidence level may be stored and used later, with higher security events requiring a higher confidence level than actions or events requiring a lower confidence level. In some other examples, the matching may be carried out either within a secondary linked mobile application or within an external (e.g. a cloud-based and/or separate) server. In some examples, the match result may be a "yes" or "no" indication.

In the example, the physical token stores an image of the user but the data within the chip 40 of the physical token 30 may contain data describing a different biological feature of the user 50. Similarly, different sensors within the mobile device 20 may be used to generate sensor data that describes different biological feature(s) of the user so that a match can be obtained between the sensor data and the data describing the biological feature of the user stored within the chip 40 of the physical token 30. Different biological features may include voice patterns, iris images, and/or fingerprints (and have corresponding fingerprint sensors within the mobile device 20).

The mobile application within the mobile device 20 generates a user credential or verification attribute from the data describing the biological feature of the user (i.e. the image stored within the chip 40) and the sensor data (e.g. a live image of the user 50). In this example, the verification attribute includes an indication of the match and a unique identifier of the user. This unique identifier may be a cryptographic key or the verification attribute may be signed using a cryptographic key (e.g. a private key) of the user. This verification attributes acts as an initial or anchor claim and stored in a claim wallet of the user (either on the mobile device 20 or in a part of an external server only accessible to the user). One or more user data attributes are stored together with the generated verification attribute within the claim wallet and the one or more user data attributes are associated with or stored together with the verification attribute. Association may be made by means of identifiers or other keys or hashes linking the data items.

Whilst the user data attributes and verification attribute are stored within the claim wallet within the mobile device 20 or secure data store, cryptographic material used to initiate a secure communication channel between parties and the same or corresponding cryptographic material used to generate the verification attribute may be stored within a distributed ledger 60. This may be a corresponding public key to the private key used to sign or encrypt the verification attribute. For example, this distributed ledger may be based on blockchain technology similar to that used within bitcoin systems or other distributed ledger technologies that do not rely on blockchains, such as hashgraphs or non-linear structures based on directed acyclic graphs, for example.

Preferably, the distributed ledger has different instances stored in separate storage locations 70 that may be used for verification or redundancy purposes.

Figure 2:
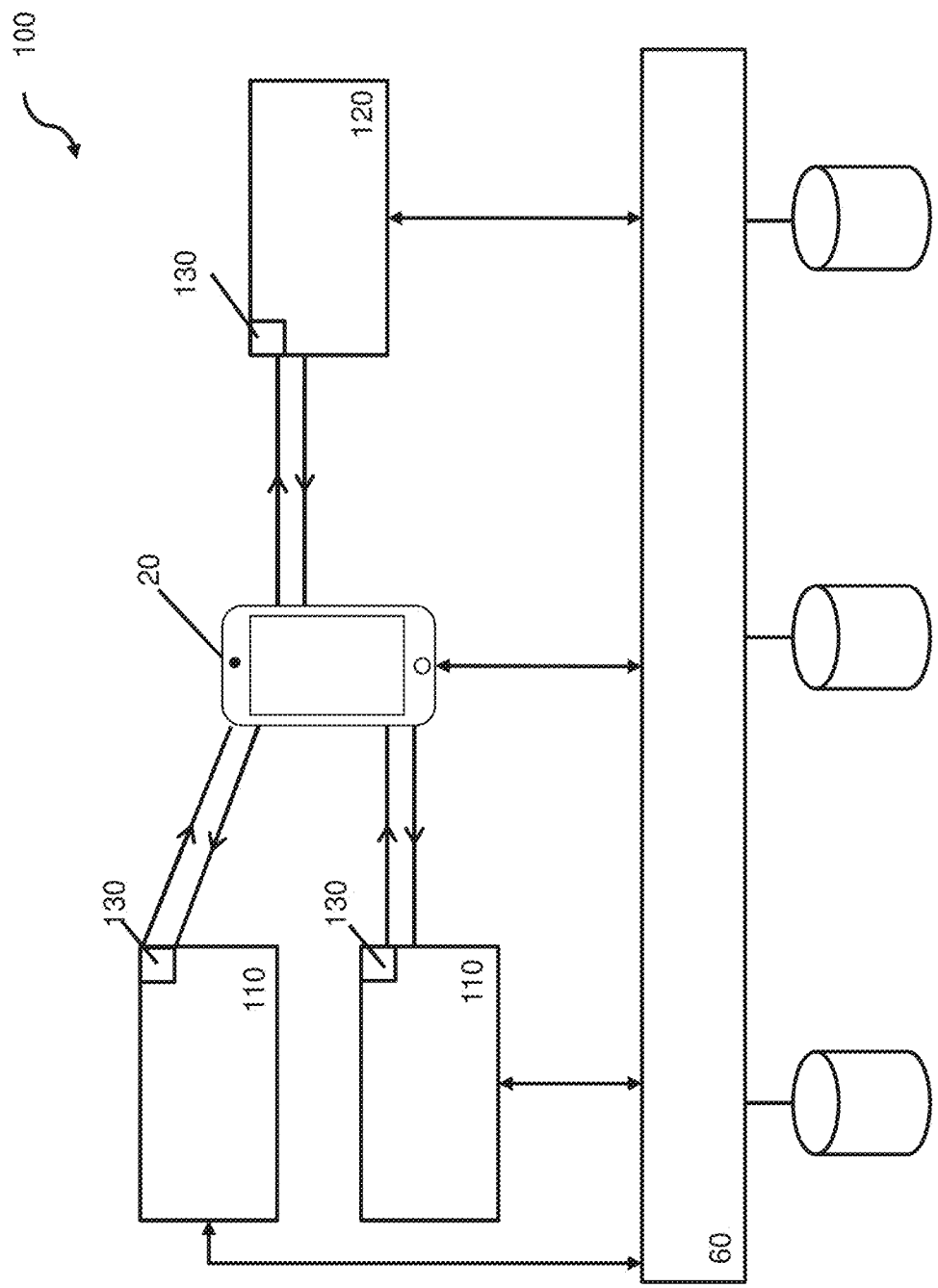
FIG. 2 shows a schematic diagram of a system for securely communicating data.

FIG. 2 shows a schematic diagram of a system 100 and method for securely communicating user data attributes and verification attributes between separate entities. The system 100 of FIG. 2 may be used after the method described with reference to FIG. 1 has been carried out and the user 50 has already been added or enrolled into the system 10 by creating and storing their verification attribute and storing their public key within the distributed ledger.

In the system 100 of FIG. 2, a new entity or organisation 120 (e.g. a merchant) may request user data attributes from the user. Such requests may be sent using system-wide application programming interfaces (APIs) 130 that sends a request and receives a response from the mobile device 20 of the user. The APIs are used as endpoints of a point to point (p2p) secure communication secured using cryptographic key(s) of the user and/or requester or other party to the p2p communication. Such requests may also create a log within the distributed ledger 60. Again, no user data is retained within the distributed ledger 60. The cryptographic keys may be exchanges using the public keys stored on the distributed ledger 60.

Prior to receiving this request, the mobile device 20 may have already stored the requested data either locally or on a cloud server. In any case, the verification attribute should have already been created and stored in the user's wallet. Furthermore, the particular user data attributes may be derived from either the physical token 30 used to set up the user or from different (e.g. trusted) organisations 110 that already have a relationship with the user 50. In the scenario shown in FIG. 2, these requested user data attributes are provided by the trusted organisations 110. Again, communication between the mobile device 20 and the trusted organisations 110 are achieved through the p2p secure communications set up using cryptographic material stored within the distributed ledger 60. A requester 120 may act as a trusted organisation 110 for other requesters, for example.

Provided that the user has already been enrolled (i.e. their public key has been stored in the distributed ledger 60 and their biometric data confirmed when creating a verification attribute), the user is able to provide responses to request for user data attributes. The mobile application operating within the mobile device 20, requests the data (that may have already been requested by requester 120) from the trusted organisation 110. This communication may also be secured using cryptographic keys stored in the distributed ledger 60. Once the user data attribute (e.g. a delivery address) is received from the trusted organisation 110 at the mobile device 20, then this is stored within the claim wallet and signed using the user's private key so that it may also be verified by the public key stored on the distributed ledger 60. A log of the receipt of this user data attribute is stored within the distributed ledger 60 or elsewhere. In order to ensure further security, the new user data attribute is also associated with the previously generated verification attribute by cryptographic signature. Alternatively, a further check to ensure that the legitimate user is operating the mobile device 20 may be made by rereading the data stored on (e.g. in printed form) or within (e.g. within an NFC chip) the physical token 30 and comparing this with further sampling or sensing of the corresponding biological feature of the user (e.g. an image of their face) and a new verification attribute may be generated. The biometric data may also be stored (e.g. in a secure and verifiable form) within the mobile device 20 and so it may not be necessary to have the physical document to hand when carrying out this additional check.

The mobile application within the mobile device 20 then responds to the request from the requester 120 by retrieving the stored data of the user data attribute and sending this to the requester 120. As the requested user data attribute is associated with the user (e.g. using the user's cryptographic key) or at least transmitted using a communication channel secured by the user's and/or requester's cryptographic key and the verification attribute in some implementations may be signed with the same or corresponding cryptographic key used to set up the secure p2p communication with the requester and stored within the distributed ledger 60, then the requester 120 can be sure that the received user data attribute(s) describes the correct (and verified) user. The user data attributed and/or verification attribute may be revoked (e.g. within the distributed ledger) or have an expiry date so that the user must repeat the biometric liveness checks at intervals.

Digital signatures and other cryptographic techniques may be used to ensure that the provided user data attributes correspond with the user. In this way, data describing the user 50 can be passed from a trusted organisation 110 to a requester 120 without control being lost by the user 50 and with improved security.

As described with reference to FIG. 1, the system 100 generates attestations or verifiable claims regarding user data attributes. The figures show these as claims but these are all attestations that include user data attributes. Claims are stored in a claims wallet that may be stored on the mobile device 20 or at an external server. The claims wallet is only accessible to one particular user (the user described by the claims). These claims are bound to the user and the user is verified as being the same person that holds the physical token by matching the user's biometric data against sensor data acquired by that same user. These claims, together with the verification attribute, are stored within the claims wallet (not shown in this figure).

FIG. 2 illustrates two trusted organisations 110 that provide the user data attributes. However, many more and different trusted organisations 110 may be used and added to the system 100, whenever needed. Furthermore, many different users may be active within the system 100. Different users may have existing relationships with different trusted organisations 110 and so there may be different sets and combinations of these trusted organisations 110.

Whilst individual claims may be requested by the requester 120, the requester 120 may request more than one user data attribute at a time. Multiple user data attributes may be included within a single claim or separate claims may be combined to form new claims. These new claims may also be bound to the biometric data acquired by the user either in advance or at the time that the claim is being generated and saved within the claims wallet. Combining claims can be useful, especially when user data requested by a particular requester 120 is derived from more than one trusted organisation 110. These figures show a single mobile device but many may be used within the system. Furthermore, any number of requesters 120 may be included or added to the system 100.

Figure 3:
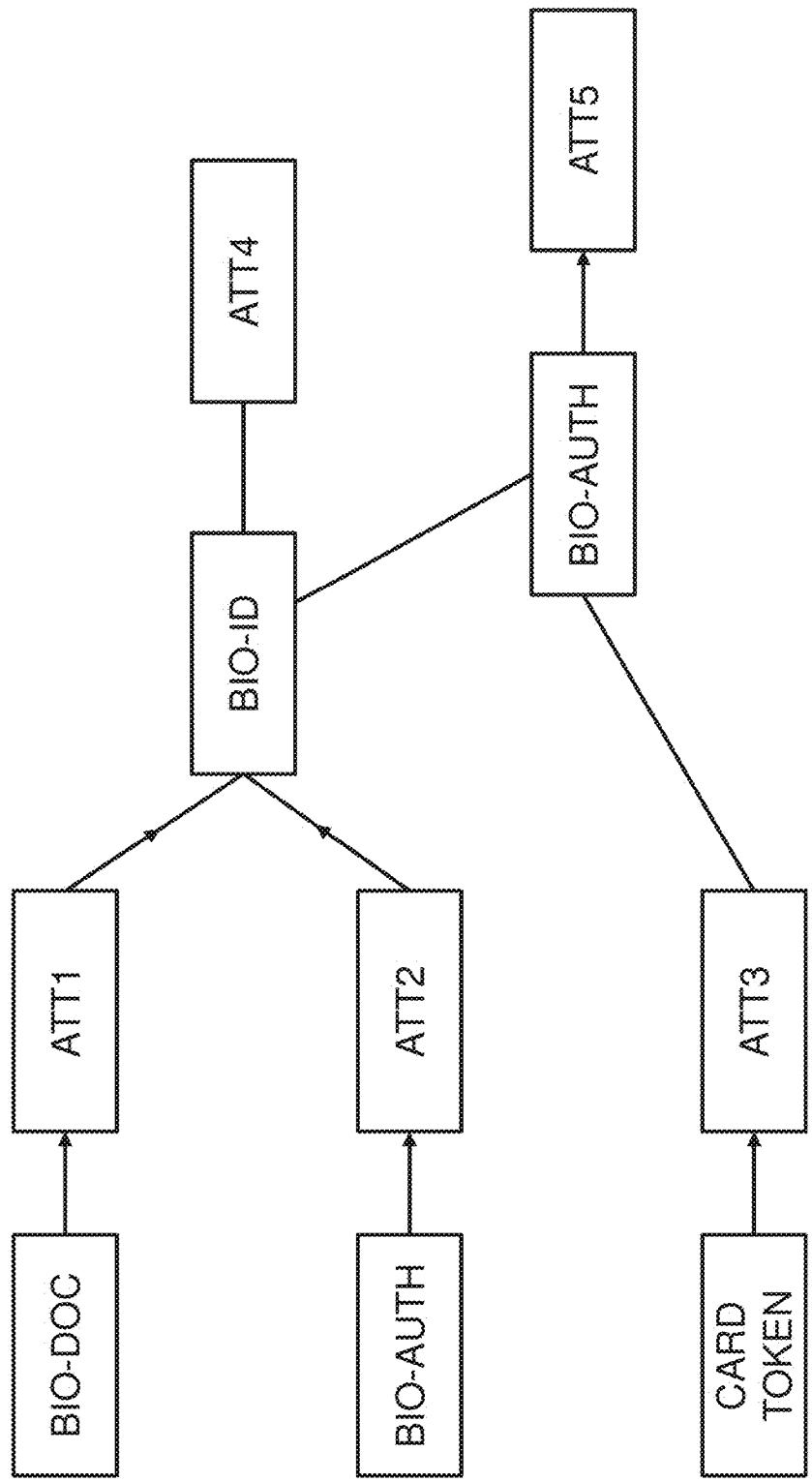
FIG. 3 shows a schematic diagram of the data attributes of the user of FIG. 1.

FIG. 3 illustrates schematically the combining and binding of claims or attestations to form new claims and how these are associated and bound with biometric data credentials. FIG. 3 also shows a card token (in the form of a further user data attribute) that may be derived from a payments card, being combined with another user data attribute. This process allows a requester 120 to request user data attributes as well as payment information simultaneously. Therefore, the requester 120 may receive payment for a particular good or service at the same time as receiving the response from their request. For example, a car hire company can receive payment for the car hire service as well as driving license details from the user. This simplifies the process and reduces the required flow of information and required bandwidth for a particular transaction or event.

At a high level, the architecture involves an issuer of claims or attestations, a holder of those claims (e.g. the user), a requester and a registry of identifiers. The issuer issues claims to the holder who can present them to the requester (over a secure communication channel). The requester (and issuer) can verify identities of users with the registry (e.g. using the distributed ledger).

FIGS. 4 to 7 show flow diagrams illustrating in more detail the various implementations of the method for securely storing data attributes of a user within the claims wallet. In these figures, the attestations containing the user data attributes are shown as claims and they are stored within a claim wallet (storage location) either within the mobile device 20 or in an external repository.

Figure 4:
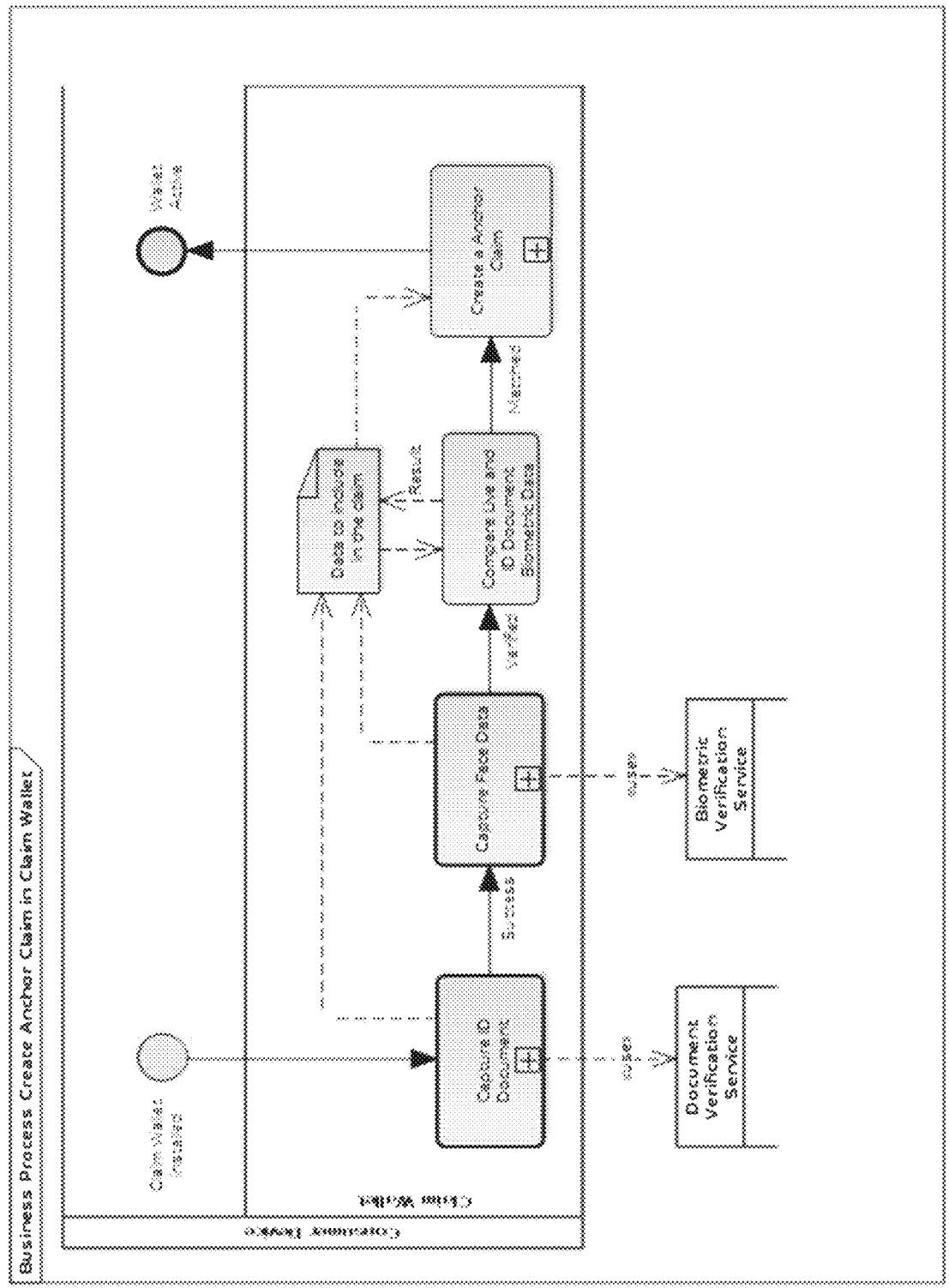
FIG. 4 shows a flow diagram of a method for securely storing data including steps for capturing biometric data.

The connected device corresponds with the mobile device 20 and the steps shown in FIG. 4 are carried out by one or more installed mobile applications.

The method starts with the mobile device 20 reading data from within the chip 40 of a physical token 30 or ID document. Biometric data (e.g. an image of the user) is captured by the mobile device 20 and the live biometric data (or a single image) are compared with the biometric data stored within the ID document. When a match occurs, then a verification attribute or anchor claim is created and stored within the claim wallet. Separate services act to read the biometric data from the physical token (ID document) and carry out the biometric verification steps.

Figure 5A:
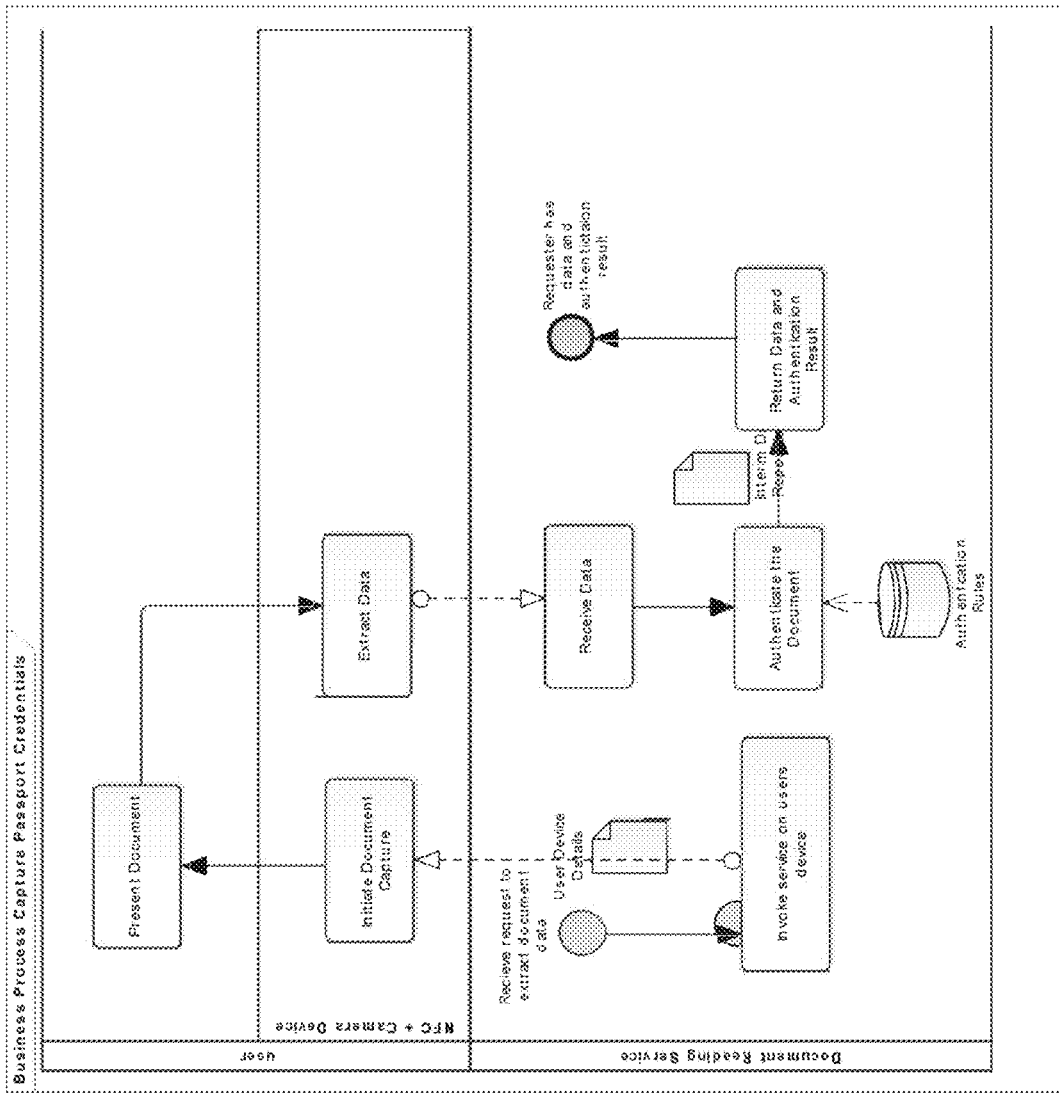
FIG. 5A shows a schematic diagram of further steps in the method for securely storing data of FIG. 4.

FIG. 5A shows in more detail the processing steps used when the biometric data is an image of the user and the physical token is read using NFC technology. As the physical token may include specific reading requirements, including security features, then a document reading service may be invoked in order to obtain the data stored within the chip 40 of the physical token 30. FIG. 5A illustrates further steps for authenticating the physical token, including the use of authentication rules.

Figure 5B:
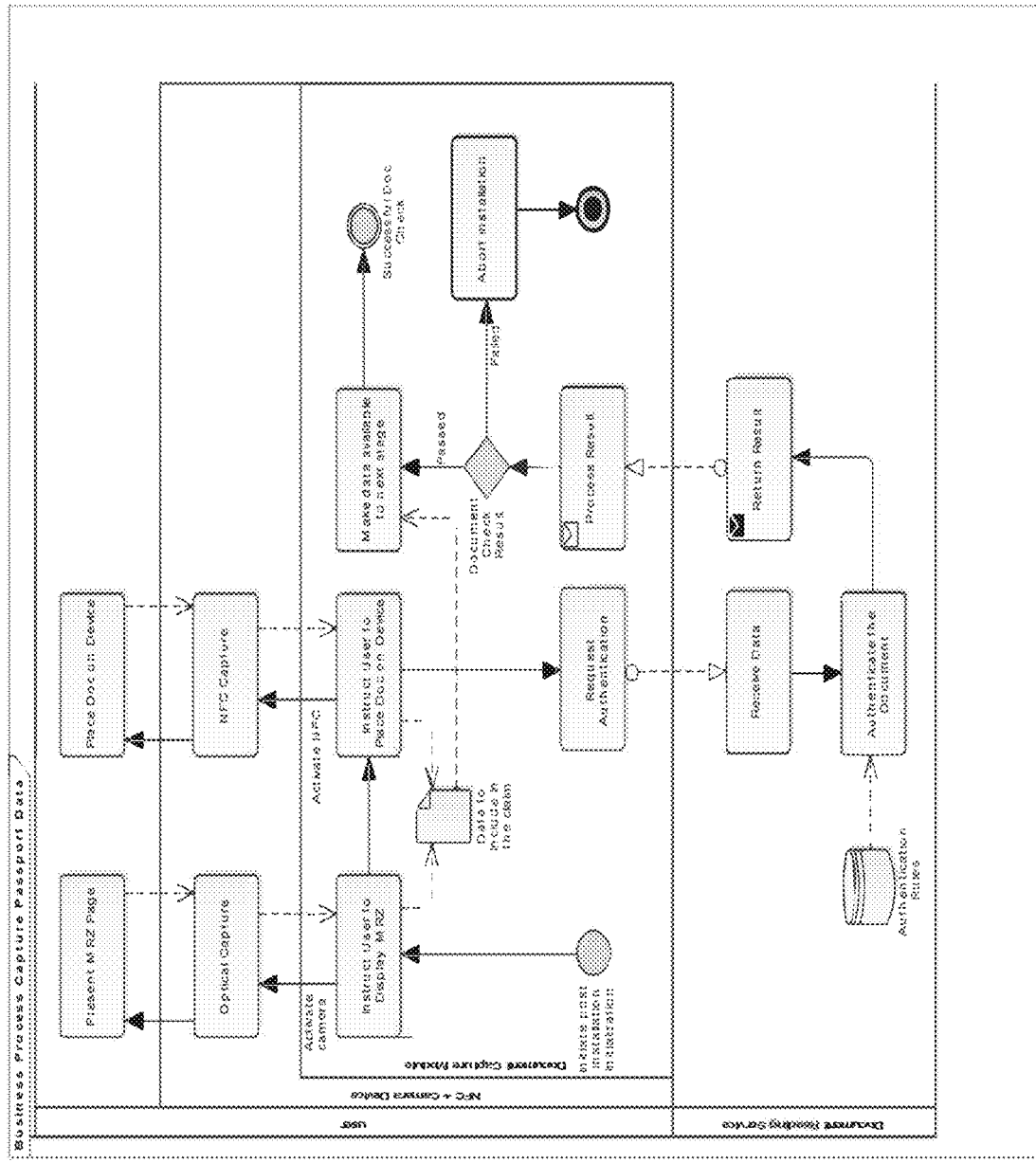
FIG. 5B shows a schematic diagram of the steps for capturing biometric data of FIG. 4.

FIG. 5B shows in more detail the step necessary to read data from a passport and authenticate this document using an external document reading service. This improves security further as it can determine the validity of the document itself.

Figure 6A:
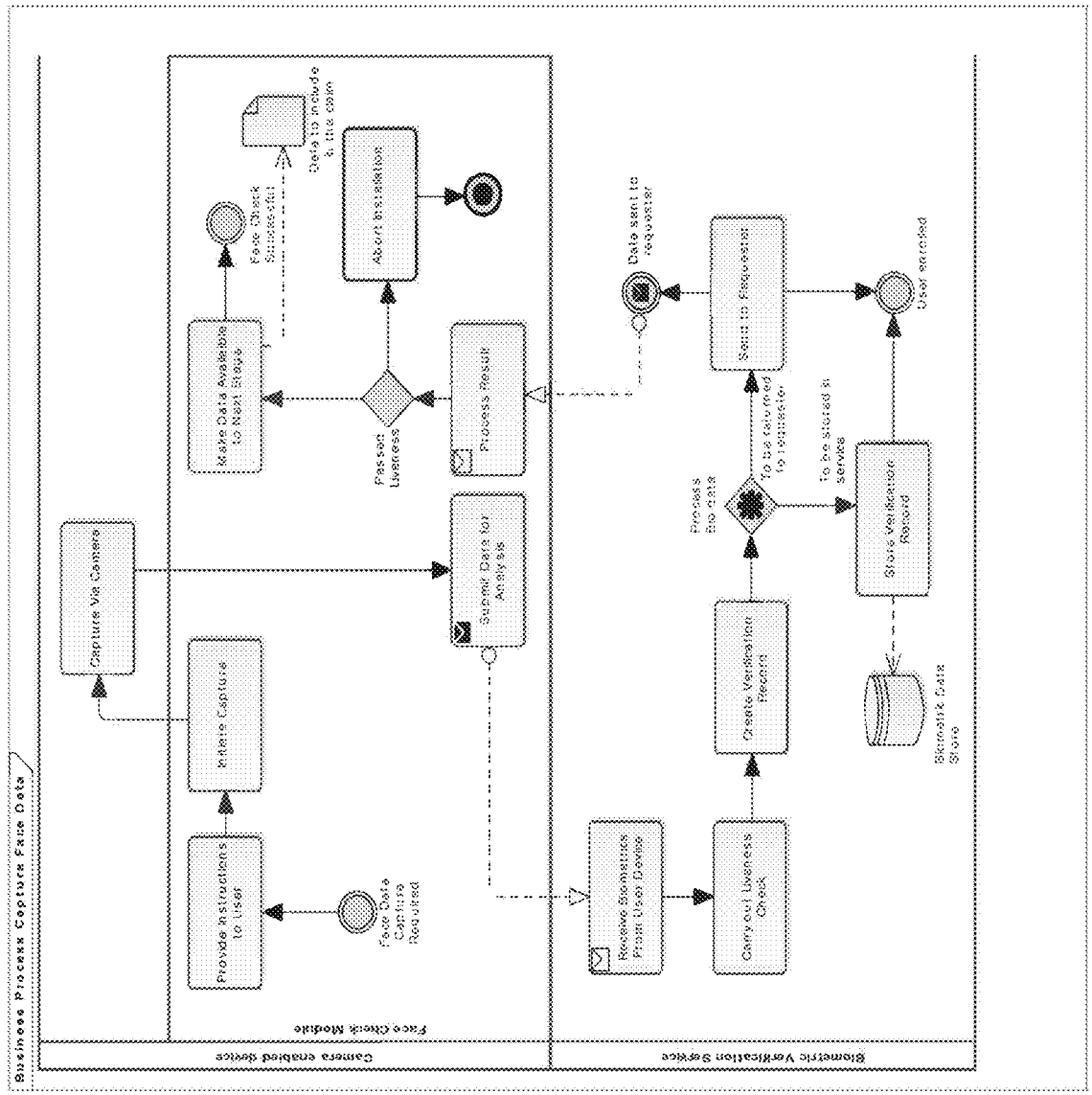
FIG. 6A shows a schematic diagram of further details of the steps for capturing biometric data of FIG. 4.

FIG. 6A shows in more detail a flow of method steps used to determine a match between the sensor data and the data described in the biological feature of the user obtained from the physical token 30. At the end of the process steps shown in FIG. 6A, the user may be enrolled or authorised to use the system and can go on to send user data attributes to a requester 120. FIG. 6A shows the interaction between the mobile device 20 and an external biometric verification service that includes a test that a live person is being detected.

Figure 6B:
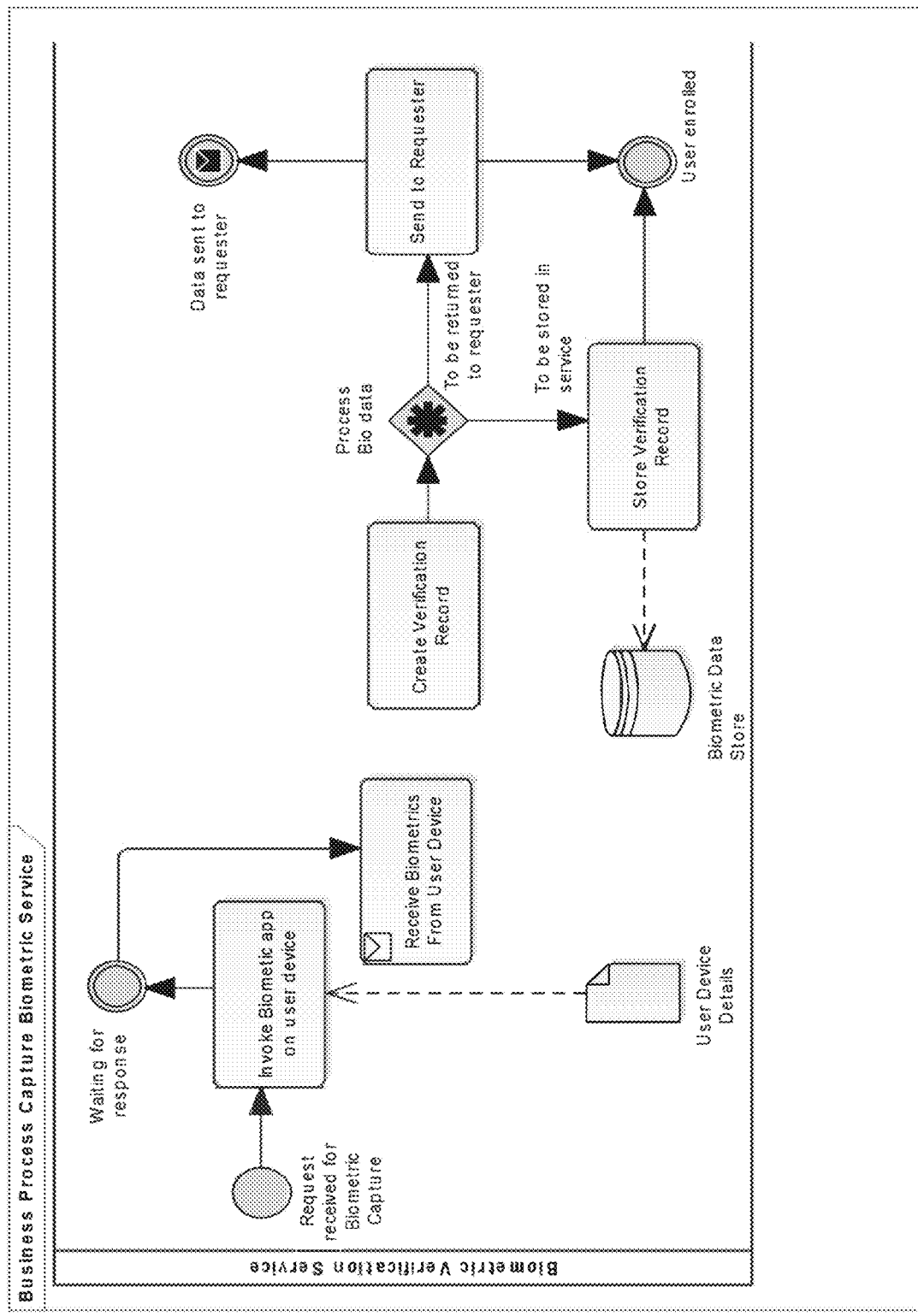
FIG. 6B shows a schematic diagram of further details of the steps for capturing biometric data of FIG. 4.

FIG. 6B shows in greater detail certain aspects of the method steps that take place within the external biometric verification service.

Figure 7:
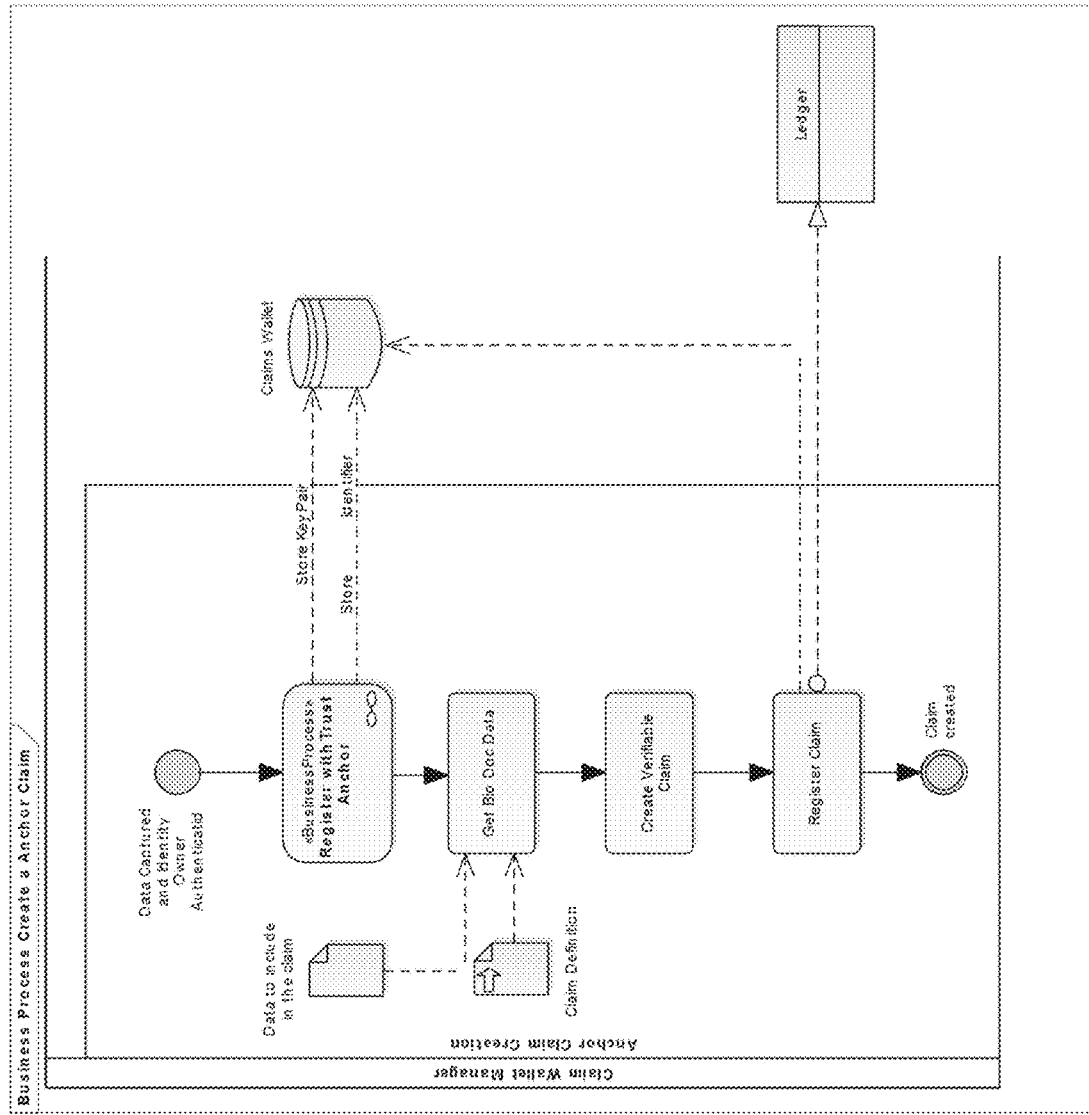
FIG. 7 shows a schematic diagram of further steps in the method for securely storing data of FIG. 4.

FIG. 7 shows in more detail the method steps used to create a claim or attestation within the claims wallet and the registration of that claim with the distributed ledger. The data to include within the claim may be derived from the physical token or more generally from user data attributes obtained from trusted organisations 110. FIG. 7 illustrates that a private key is used to digitally sign the claims within the claims wallet and that the claims are registered or logged within the distributed ledger 60. The key pair is also stored in the claims wallet.

Figure 8:
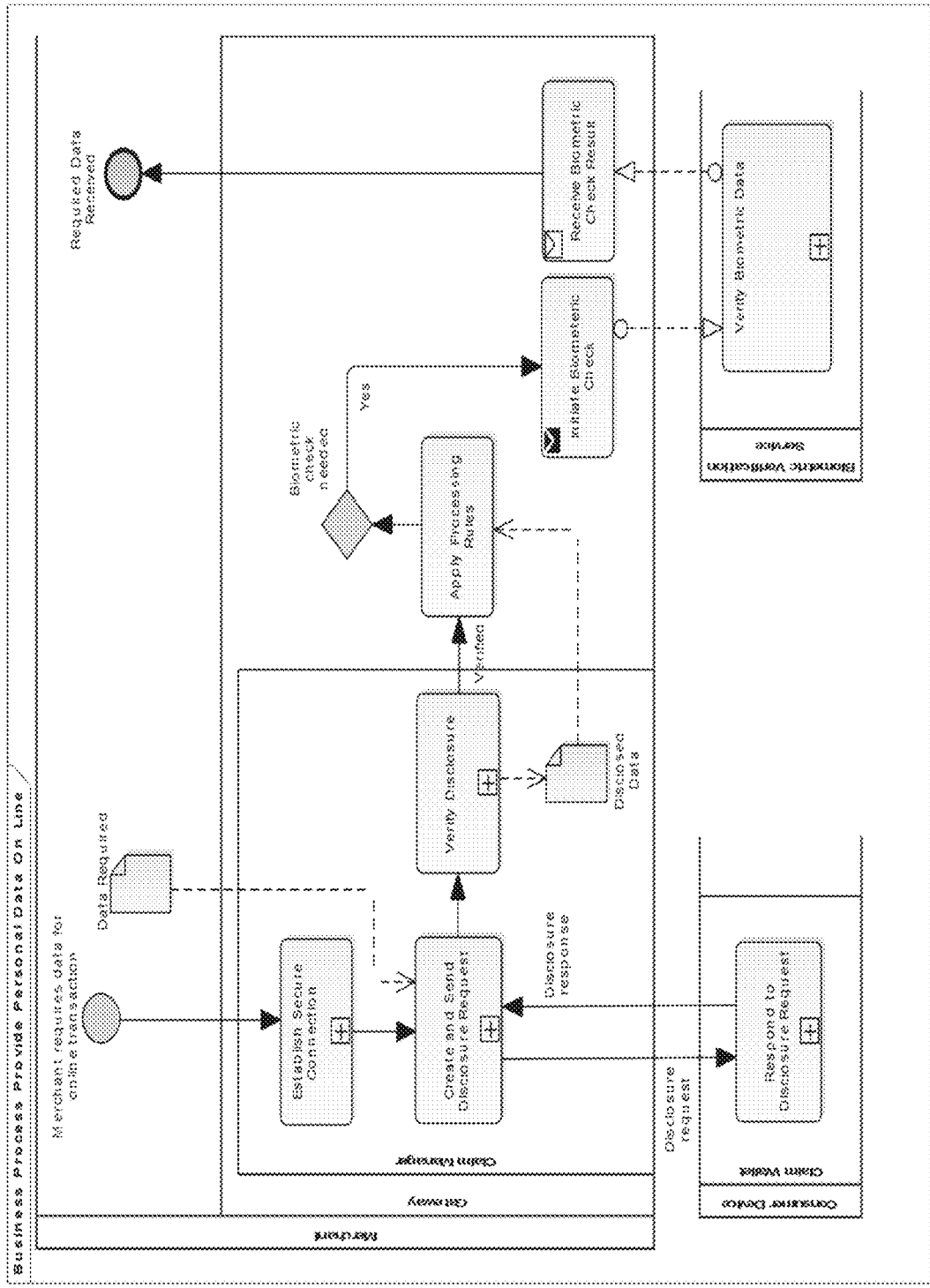
FIG. 8 shows a schematic diagram of a method for securely communicating data.
Figure 9:
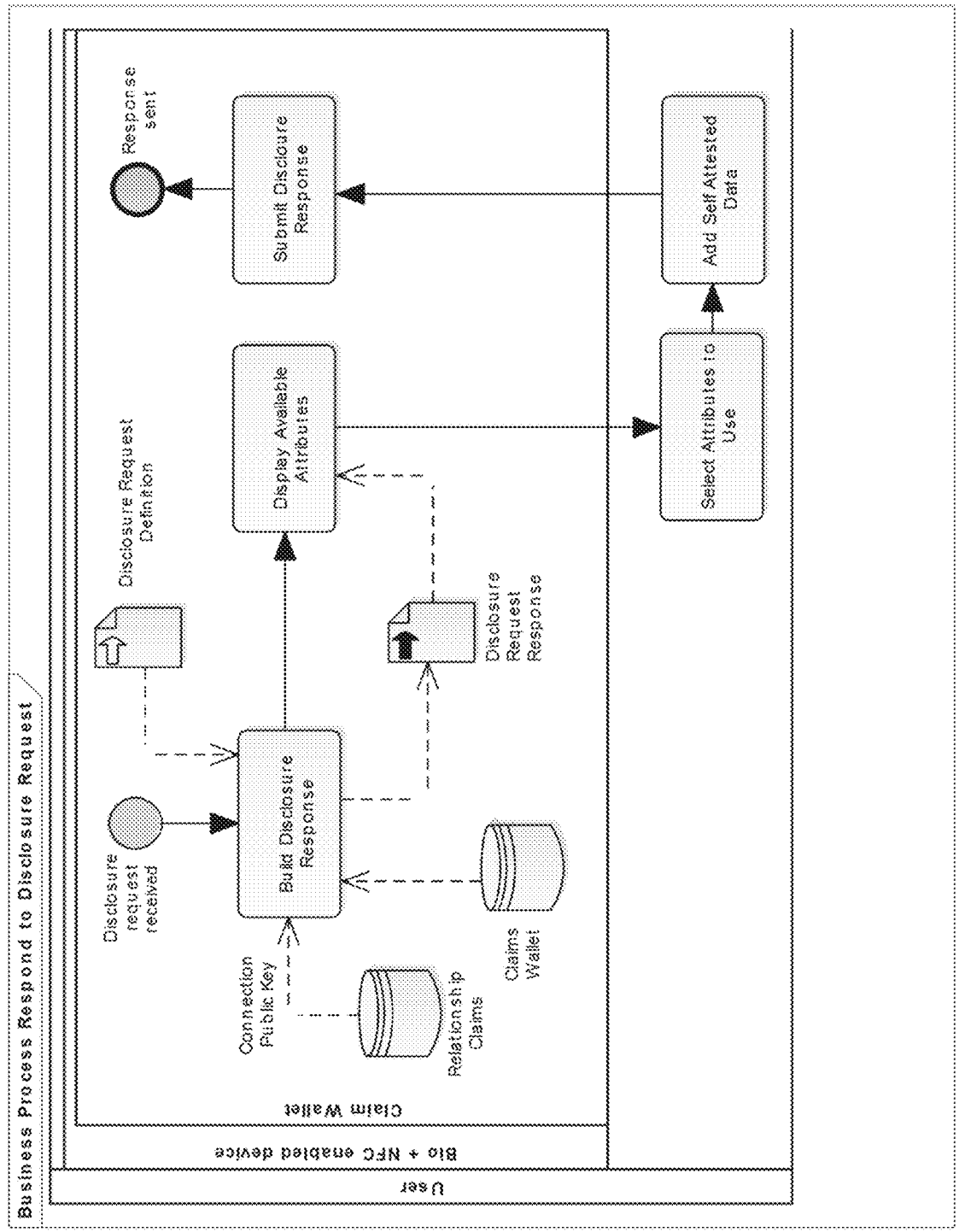
FIG. 9 shows a schematic diagram of further steps of the method of FIG. 8 for securely communicating data.
Figure 10:
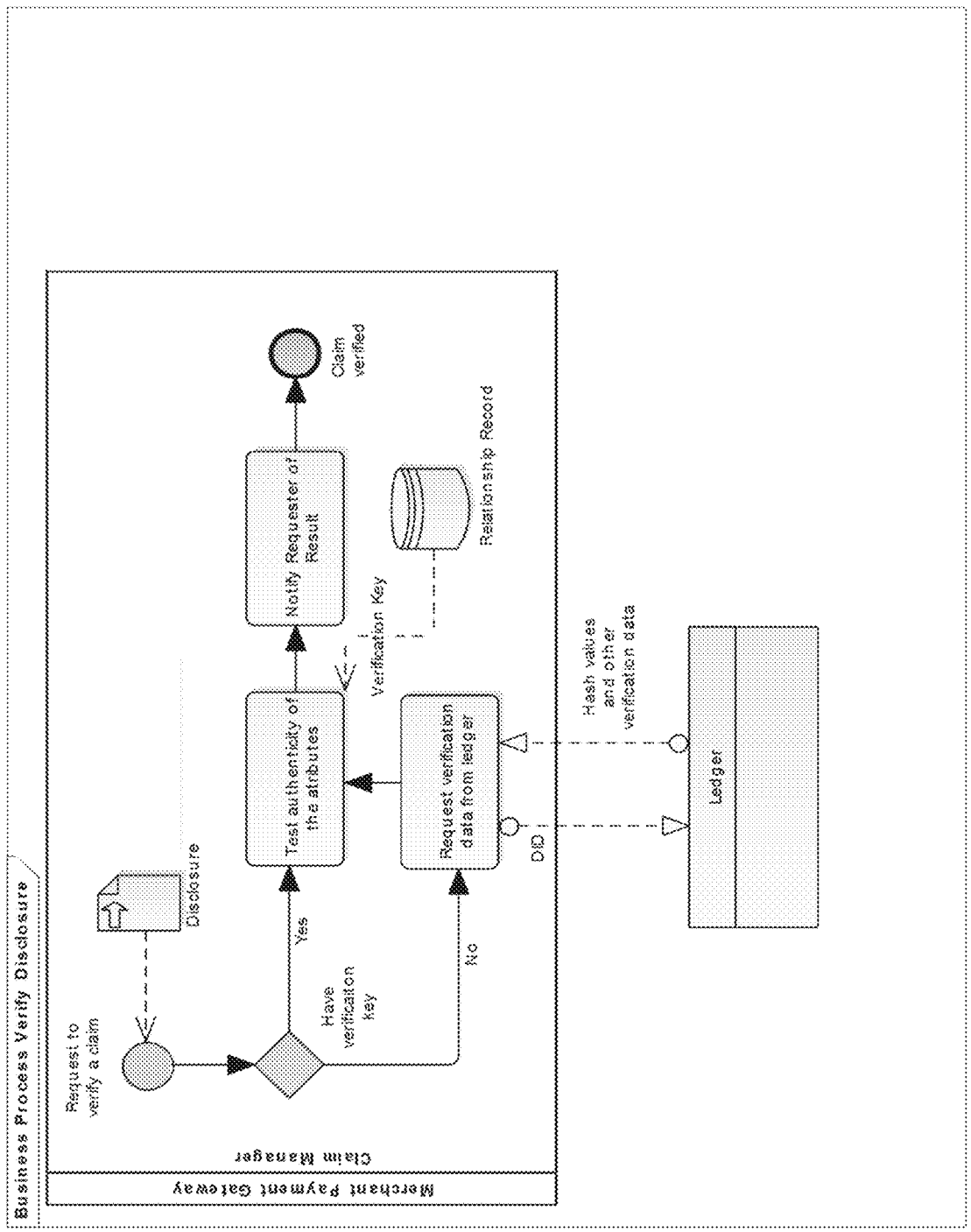
FIG. 10 shows a schematic diagram of further steps of the method of FIG. 8 for securely communicating data including steps for verifying the data.

FIGS. 8 to 10 show in more detail the method steps for securely communicating data. This method may take place after the user has been enrolled in the system although further biometric checking may take place, which can be dependent on the level of security required for particular claims or requesters.

FIG. 8 shows in more detail the method described with reference to system 100 of FIG. 2. The merchant noted in FIG. 8 corresponds with the requester 120 of FIG. 2. A secure connection can be established between the requester 120 and the mobile device 20. This may be wirelessly established or communication may be established using a graphical representation of data, such as QR codes, that are displayed and viewed using the camera on the mobile device. In some examples, the QR code presentation may initiate a wireless or internet-based communication between the requester 120 and the mobile device 20. This communication using cryptographic material (e.g. public keys of both parties) stored with the distributed ledger 60 (not shown in this figure).

Once a secure communication has been established, then the requester 120 requests user data attributes from the mobile device 20. The claim may be retrieved from the claims wallet. FIG. 8 illustrates the case when a biometric check is needed to confirm the identity of the user. Such a biometric check may take place in a similar way to that described before in which a physical token 30 is used to retrieve biometric data and compared against live or current sensor data. Such checks may take place within a mobile device 20 or using external service, for example. Upon valid verification, the response is sent to the requester 120 using the secure connection.

FIG. 9 shows further details of the method steps for retrieving the attestation or claim from the claims wallet after receiving the request and responding with the claim in the form of user attribute data and self-attested data (verification attribute). The request, response and/or generation of the claim or attestation may be logged within the distributed ledger 60 or elsewhere (not shown in these figures). FIG. 9 also shows the step of selecting particular attributes to use, as the requester may include particular user data attributes that are required and these may be different for each requester or request.

FIG. 10 shows the steps of the method that involve the requester 120 verifying the received response and user data attributes included in that response. FIG. 10 shows the use of the public key that corresponds with the private key used to digitally sign the claim or attestation stored within the claim wallet and provided by the user. The requester (merchant) may query the distributed ledger to determine the validity of the received claim. For example, the claim (or verification attribute) may have expired or been revoked. Therefore, verification data may be retrieved that corresponds with the received claims and verification attribute.

FIG. 10 shows two alternative mechanisms for verifying the claim. The first alternative makes use of the public key of the user to test the authenticity of the claim. This may include the use of certificate authorities, de-centralised authorities or other verification techniques. This same key (or a corresponding key) may be used to set up the secure communication between the user and requester. For example, if previous requests have been made then there each party may already have the verification key. When the public key is not available then the requester 120 can query the distributed ledger 60 using hash values or other cryptographic techniques to verify authenticity of the claim. In some examples, the Sovrin ledger may be used, which is supported by stewards to manage keys. A description of this example process and the decentralised nature of the ledger is described in www.evernym.com/wp-content/uploads/2017/07/What-Goes-On-The-Ledger.pdf (retrieved from the Internet 24 Sep. 2018).

Figure 11:
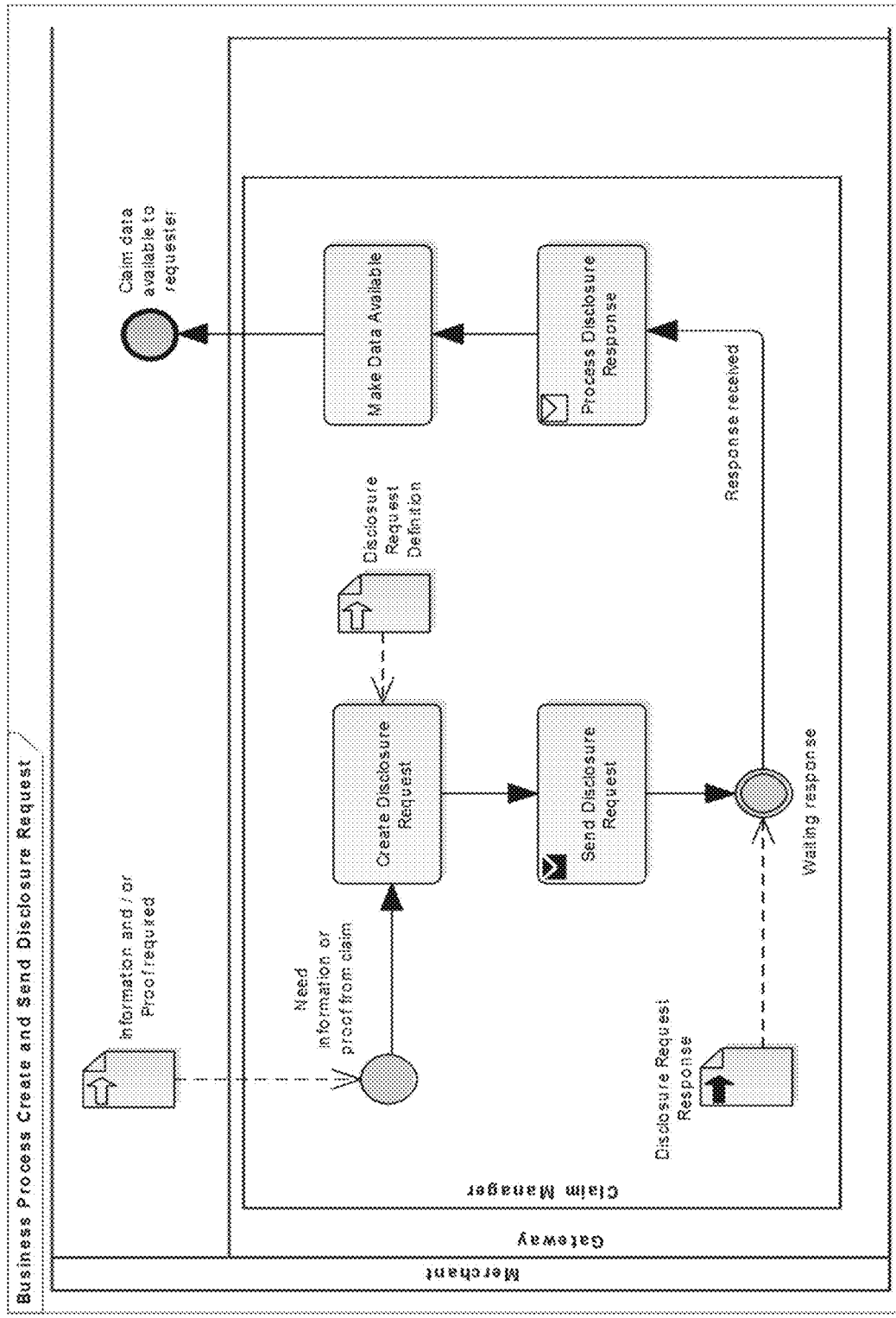
FIG. 11 shows a schematic diagram of a further method for verifying data.

FIG. 11 illustrates the method steps of a requester making a request from a user for user data attributes. A claim definition may also be generated. The claim definition or template describes the structure, format, length or other properties of the claim but not the claim data itself. This claim definition may be stored within the distributed ledger 60 or elsewhere. Therefore, the requester can check the format of the received claim against this claim definition for verification purposes.

Figure 12:
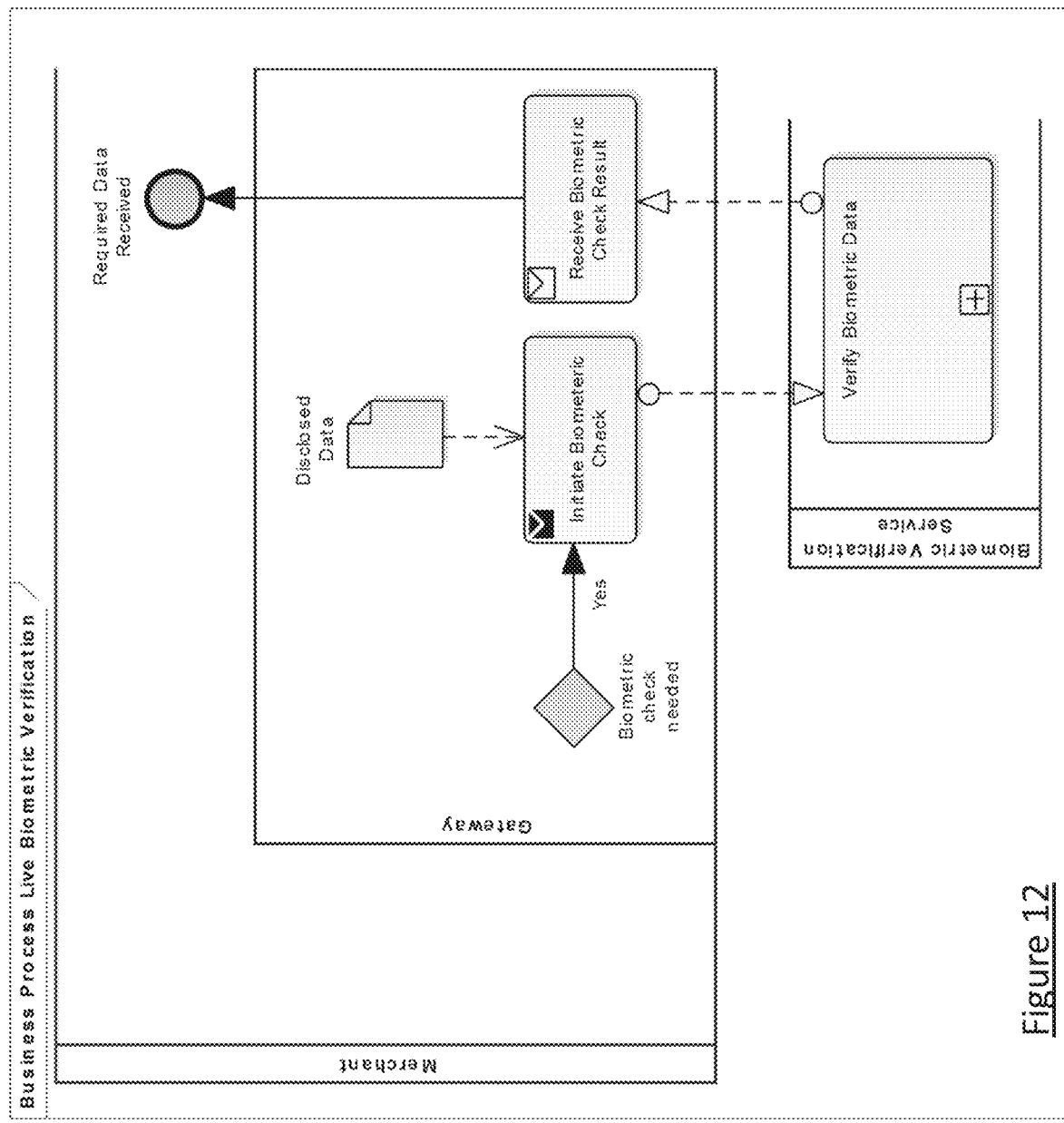
FIG. 12 shows a schematic diagram of a further method for verifying data.

FIG. 12 illustrates when a fresh genuine live or current check of the biometric data is required. This may be due to the higher risk profile of a transaction or other use of the user attribute data or where the credential is older than a certain predetermined age, for example. FIG. 12 indicates that a message to the mobile device 20 invokes the mobile application to check the biometric data. This may or may not require the use of a physical token storing the biometric data as the biometric data may have already been stored within the claims wallet for later verification and so rereading the chip 40 of the physical token 30 may not be necessary a second time. In this case, the biometric authentication may not necessarily involve reading or writing to the distributed ledger 60.

Figure 13:
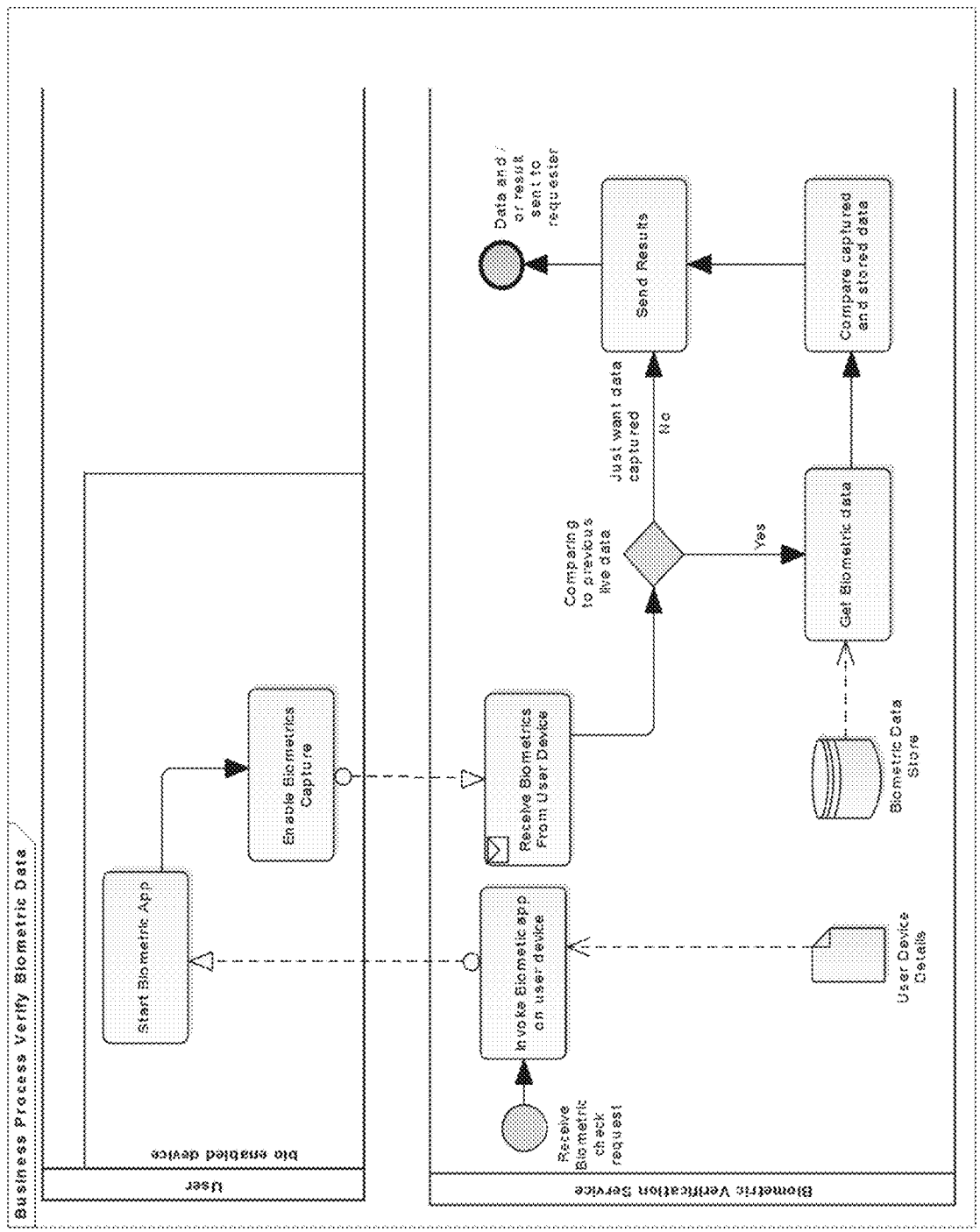
FIG. 13 shows a schematic diagram of a further method for verifying data.

FIG. 13 illustrates further details regarding the biometric verification steps used throughout the system. An external biometric verification service is initiated to complete these steps.

Figure 14:
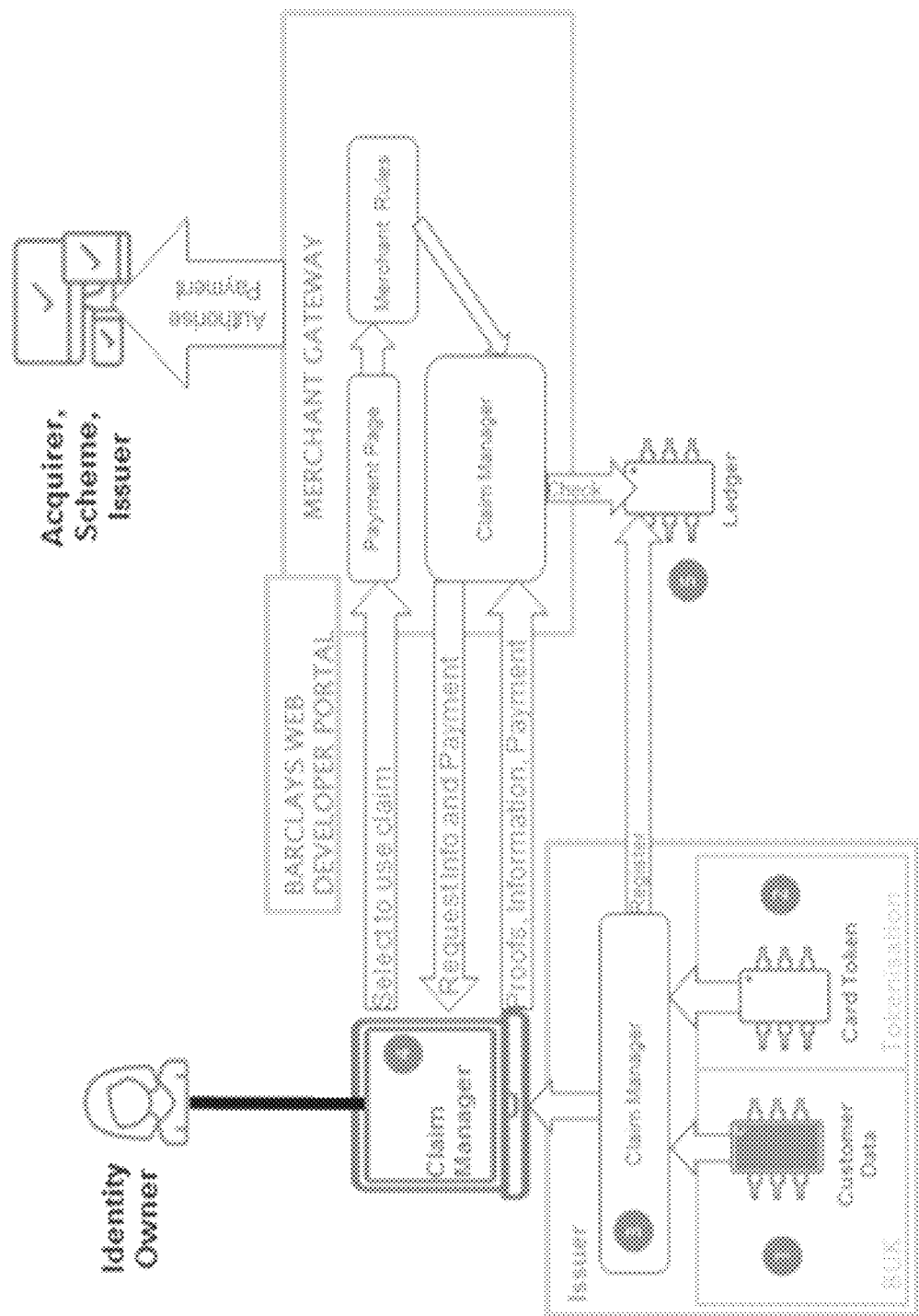
FIG. 14 shows a schematic diagram of a system for securely storing and communicating data.

FIG. 14 shows a schematic diagram illustrating further aspects and components of the system 100. In this and other examples, the distributed ledger may be provided or based on the Sovrin ledger supplied by the Sovrin Foundation. An issuer, bank or other trusted organisation (1) may issue the claims or user data attributes. A card issuer (2) may provide a tokenisation service that creates a token that corresponds to a payment card. The claim manager (3) is used to create a verifiable claim from customer data and the payment token. Preferably, the user data attributes are bank-grade (or similar) data.

The claim manager (4) enables the user or identity owner to use a particular claim (user data attribute(s)) to make a purchase and/or provide requested user data attributes to the merchant (requester 120). New claim definitions or templates may be registered and existing definitions may be verified at step (5).

FIG. 14 illustrates three streams or data flows in which:
1. Make the payment—Identity gateway services allow requesters 120 (e.g. merchants) to utilise verifiable claims during customer transactions;
2. Digital onboarding—Captures data to create verifiable claims; and
3. Tokenisation—Generates tokens for payment cards to be used during payments.

It should be noted that it is not always necessary to include the payment or tokenisation as requests for user data attributes may be made even where payments are not required. This may be useful for other data exchanges, especially of personal user data.

Figure 15:
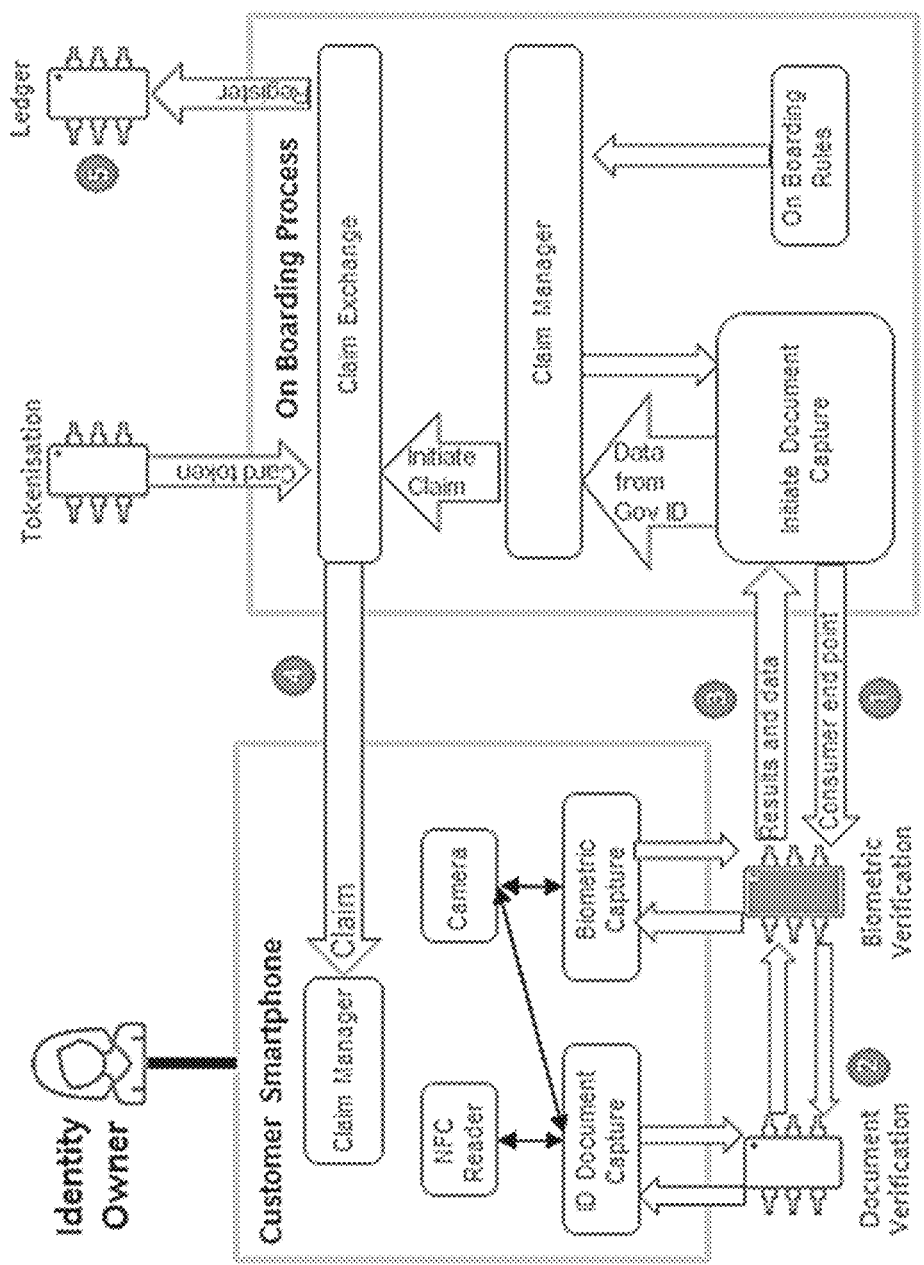
FIG. 15 shows a schematic diagram of a further portion of the system of FIG. 14.

FIG. 15 shows in more detail the onboarding process. Step (1) illustrates user data being captured. This step requires the use of a physical token 30, such as a government issued ID. In this example implementation, Iproov is used to capture the biometric data from the chip 40 within the physical token 30. This step orchestrates a ReadID process to invoke document capture within the mobile device 20 and verifies the captured data.

Biometric verification takes place at step (3). Preferably, this involves live verification of the biometric data read from the physical token 30. This step returns data from the physical token 30 plus a credential that may be stored (e.g. within the mobile device 20) for future biometric verification, should this be required.

A claim is created at step (4), which involves combining the biometric data, user data attributes (e.g. from the chip 40 within the physical token 30) and optionally the payment token. Step (5) shows the logging or registration of new claims within the distributed ledger 60 where the claims themselves are stored within the mobile device 20.

Preferably when payments are requested, the tokenised card details may be 'signed' or correlated with the document extract claim and the live biometric claim so as to afford it an enhanced card not present status. This may provide an enhanced payment credential for a card not present (CNP) transaction, which may avoid the need to invoke secure customer authentication (SCA). This in turn helps to reduce payment friction and to decrease false positive declines or SCA requests. This may also to reduce CNP fraud instances.

Figure 16:
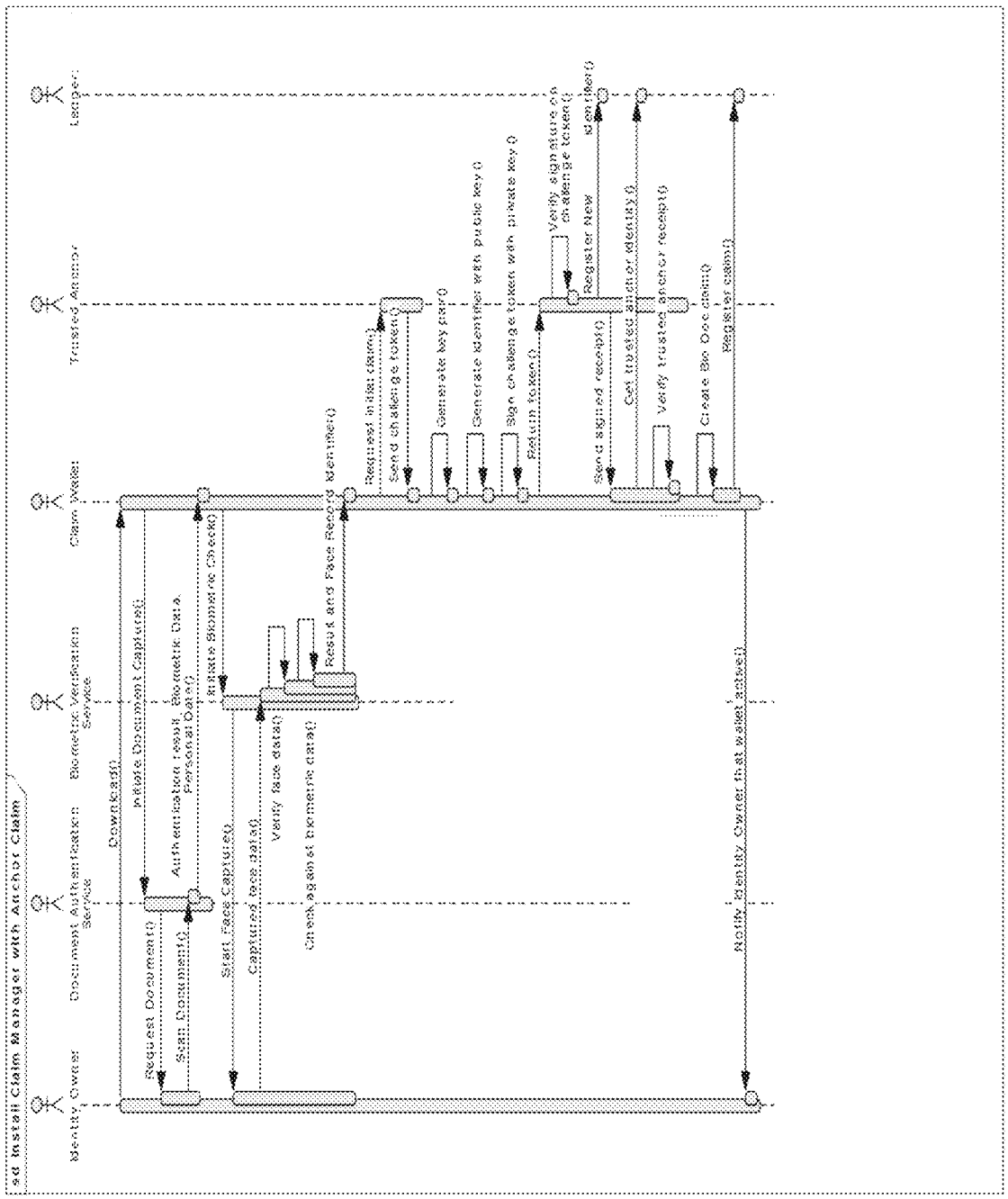
FIG. 16 shows a sequence diagram of a method for securely storing data.
Figure 17:
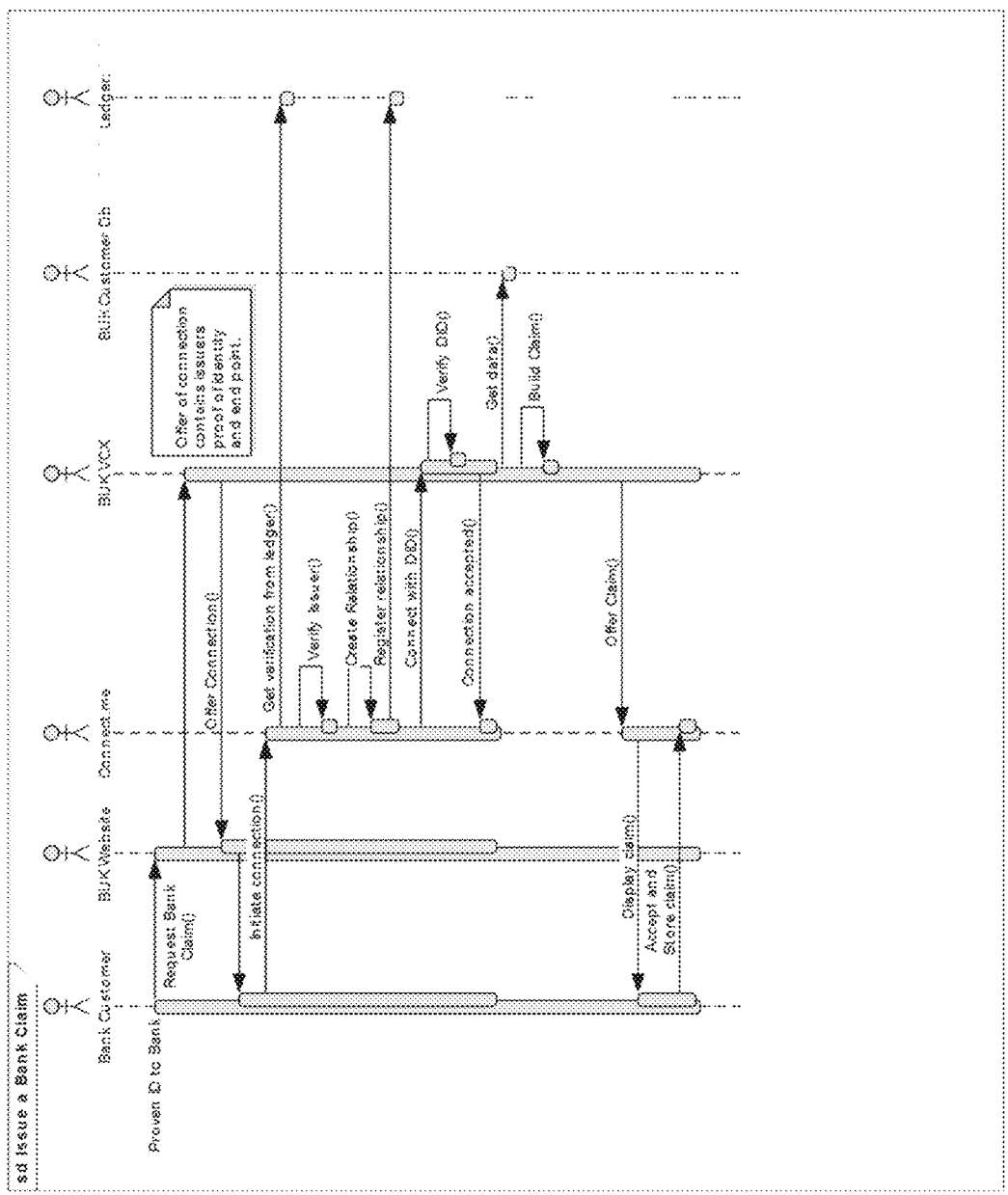
FIG. 17 shows a sequence diagram of a method for securely storing data.
Figure 18A:
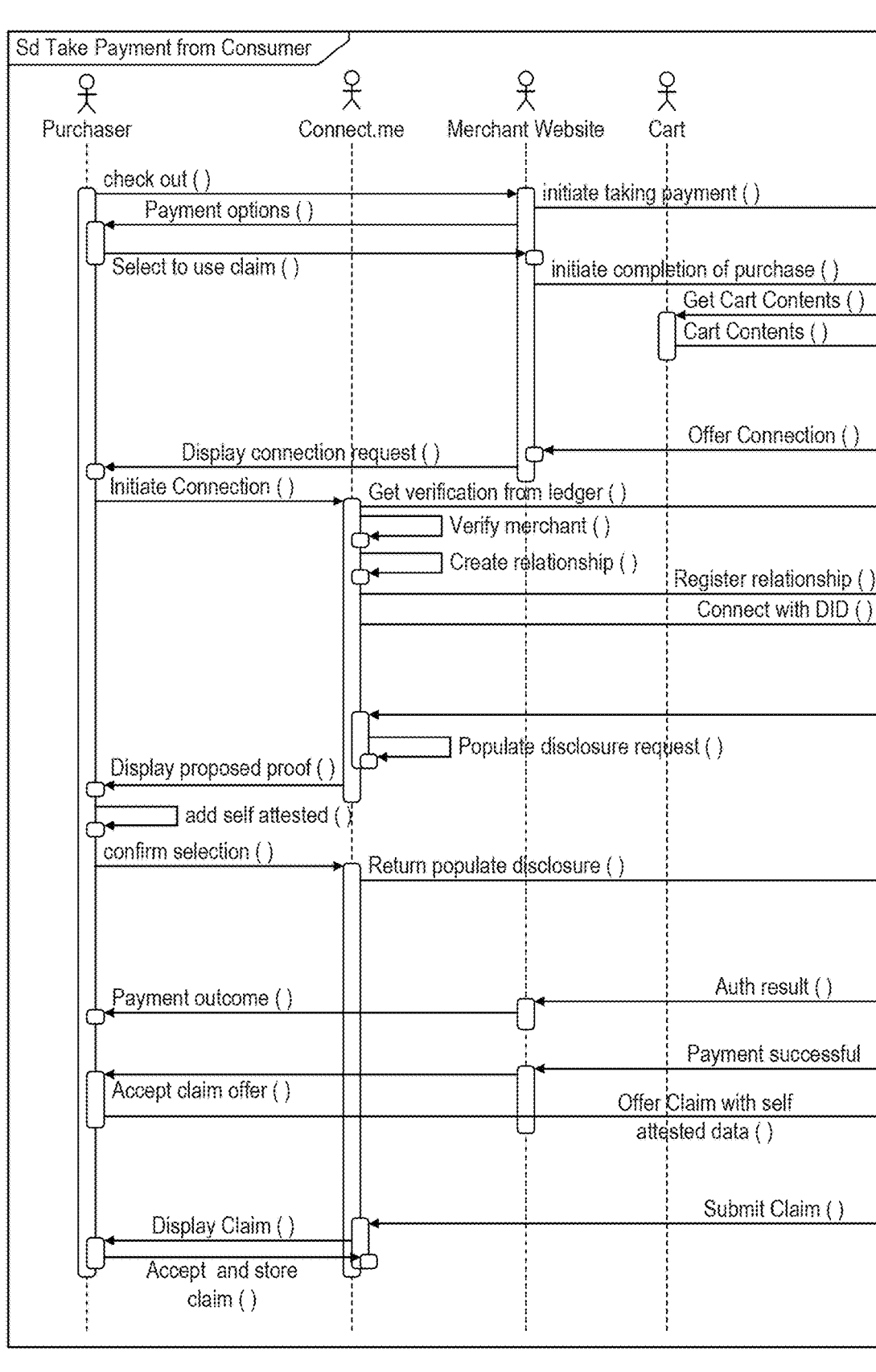
FIGS. 18a and 18b show a sequence diagram of a method for securely communicating data.
Figure 18B:
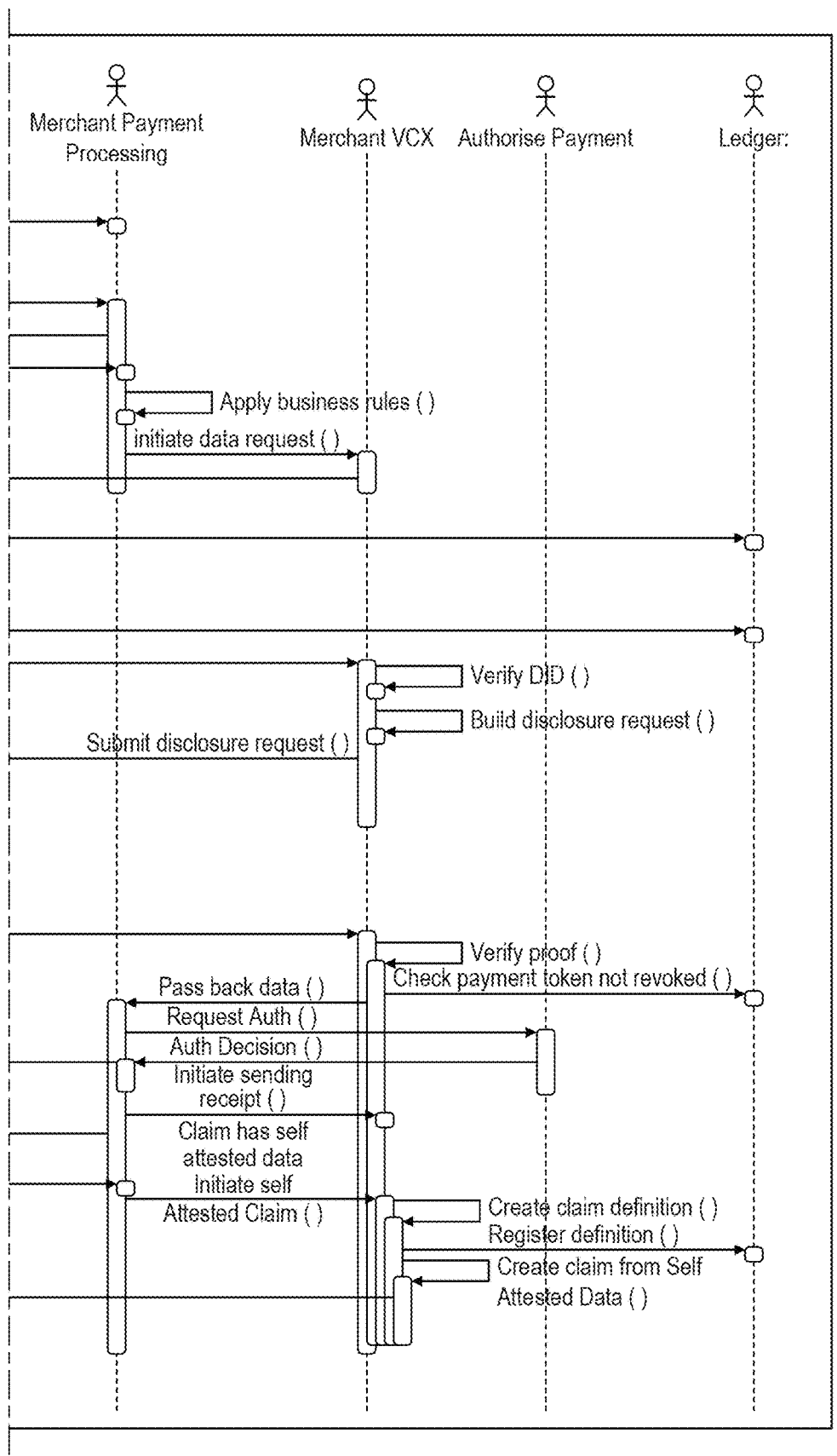

FIGS. 16 to 18B illustrate sequence diagrams showing the flow of information between different components in the system. FIG. 16 illustrates the process steps used to create the initial or anchor claim (verification attribute) in the claim wallet following biometric verification. FIG. 17 shows the generation of a new claim issued by a bank for the user. FIGS. 18A-B illustrate the flow of data used to make a payment that accompanies requested user data attributes (of the user or purchaser) requested by a merchant.

Figure 19:
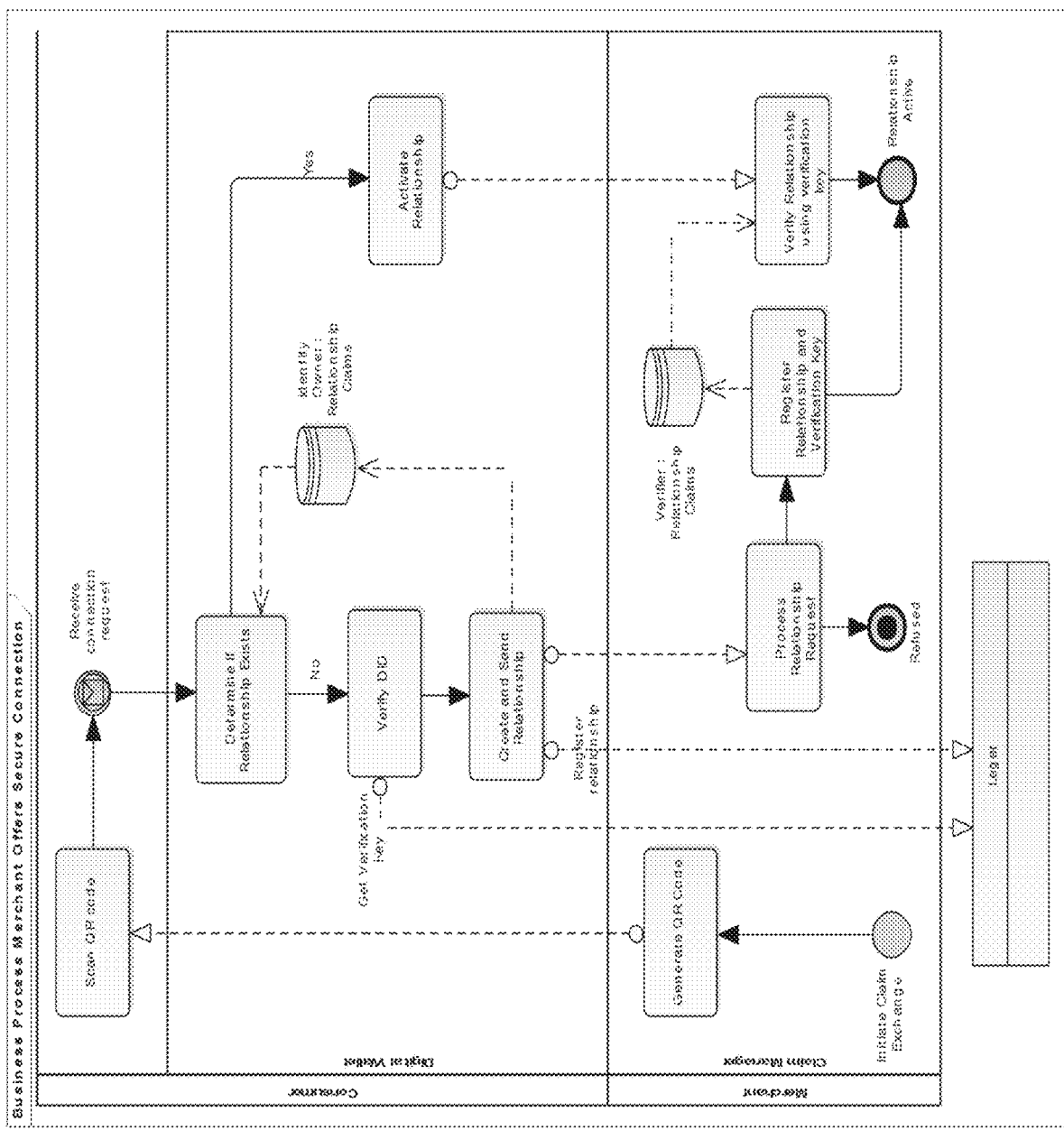
FIG. 19 shows a sequence diagram of a method for securely communicating data.

FIG. 19 shows the initiation of a secure p2p connection between a user (consumer) and requester (merchant) using a QR code and distributed ledger to store the keys of the participants.

As will be appreciated by the skilled person, details of the above embodiment may be varied without departing from the scope of the present invention, as defined by the appended claims.

For example, other type of physical tokens and digital storage within them may be used.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method for receiving attestation of user data, the method comprising:
    receiving, using a secure communication, at a mobile device a request from a requester, the request including an indication of a data attribute of the user of the mobile device;
    at the mobile device, querying a data store for a verification attribute associated with the requested data attribute;
    in response to the request, providing the requester, using the secure communication, the verification attribute from the data store;
    attesting the data attribute originating from a trusted party by:
        retrieving, from a distributed ledger, data describing the data attribute, including an identifier of the trusted party and/or a cryptographic signature of the trusted party; and
        confirming that the data attribute to be attested meets a predetermined level of trust based on the retrieved data describing the data attribute; and
    verifying the data attribute of the user by:
        retrieving, from the distributed ledger, data describing the data attribute; and
        comparing the data attribute with the retrieved data describing the data attribute.

2. The method of claim 1, further comprising initiating the secure communication between the mobile device and the requester using a cryptographic key to verify the identity of the requester.

3. The method of claim 2, wherein the cryptographic key used to verify the identity of the requester is stored in the distributed ledger and wherein initiating the secure communication between the user of the mobile device and the requester includes retrieving the cryptographic key of the requester from the distributed ledger.

4. The method of claim 1, wherein the data describing the data attribute describe any one or more of: size, length, data structure, format of the data attribute, creation time, expiration, and/or revocation.

5. The method according to claim 1 further comprising storing within the distributed ledger, a log of the request and a log of the response.

6. The method according to claim 1, wherein the data store is within the mobile device or within an external database accessible over a network.

7. The method according to claim 1 further comprising the requester storing a log of the request and a log of the receiving the data attribute.

8. The method of claim 1, wherein the verification attribute is generated from a token issued to the user.

9. The method of claim 8, wherein the verification attribute is generated from one or more data items of the token, the one or more data items comprising information characterising a biological feature of the user.

10. The method according to claim 1, further comprising initiating the secure communication between the user of the mobile device and the requester by using a graphical representation of data displayed by the mobile device to the requester, wherein the graphical representation of data includes a cryptographic key of the user and/or a cryptographic key of the requester.

11. A method for receiving attestation of user data, the method comprising:
    receiving, by a mobile device, a verification attribute associated with a data attribute of a user of the mobile device, the verification attribute generated by a computing device based on a token issued to the user of the mobile device;
    receiving, using a secure communication, at the mobile device a request from a requester, the request including an indication of the data attribute of the user of the mobile device;
    at the mobile device, querying a data store for the verification attribute associated with the requested data attribute;
    in response to the request, providing the requester, using the secure communication, the verification attribute; and
    attesting, by the mobile device, the data attribute originating from a trusted party associated with the computing device by:
        retrieving, by the mobile device, from a distributed ledger, data describing the data attribute, the data including an identifier of the trusted party and/or a cryptographic signature of the trusted party; and
        confirming, by the mobile device, that the data attribute to be attested meets a predetermined level of trust based on the retrieved data describing the data attribute.

12. The method of claim 11, further comprising transmitting, by the mobile device to the computing device, a request for the verification attribute associated with the data attribute of the user.

13. The method of claim 12, wherein transmitting the request for the verification attribute is performed responsive to determining the verification attribute associated with the requested data attribute is not in the data store.

14. The method of claim 11, further comprising storing, by the mobile device, the verification attribute in the data store responsive to receiving the verification attribute.

15. The method of claim 11, wherein the receiving the verification attribute associated with the data attribute comprises receiving verification that the user has a physical attribute.

16. A system comprising:
    one or more processors of a mobile device; and
    memory storing computer-executable instructions that, when executed by the one or more processors, cause the one or more processors to:

receive a verification attribute associated with a data attribute of a user of the mobile device, the verification attribute generated by a computing device based on a token issued to the user of the mobile device;

receive, using a secure communication, a request from a requester, the request including an indication of the data attribute of the user of the mobile device;

query a data store for the verification attribute associated with the requested data attribute;

in response to the request, provide the requester, using the secure communication, the verification attribute; and attest, by the mobile device, the data attribute originating from a trusted party associated with the computing device by:

retrieving, by the mobile device, from a distributed ledger, data describing the data attribute, the data including an identifier of the trusted party and/or a cryptographic signature of the trusted party; and confirming, by the mobile device, that the data attribute to be attested meets a predetermined level of trust based on the retrieved data describing the data attribute.

17. The system of claim 16, wherein the computer-executable instructions further cause the one or more processors to transmit, to the computing device, a request for the verification attribute associated with the data attribute of the user.

18. The system of claim 17, wherein the computer-executable instructions cause the one or more processors to transmit the request for the verification attribute responsive to determining the verification attribute associated with the requested data attribute is not in the data store.

* * * * *